United States Patent
Stark

(10) Patent No.: US 12,498,470 B1
(45) Date of Patent: *Dec. 16, 2025

(54) SURFACE FOULING DETECTION

(71) Applicant: WAYMO LLC, Mountain View, CA (US)

(72) Inventor: Ethan Stark, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 162 days.

This patent is subject to a terminal disclaimer.

(21) Appl. No.: 18/488,601

(22) Filed: Oct. 17, 2023

Related U.S. Application Data

(63) Continuation of application No. 17/029,123, filed on Sep. 23, 2020, now Pat. No. 11,965,991.

(51) Int. Cl.
*G01S 7/497* (2006.01)
*B60S 1/02* (2006.01)
(Continued)

(52) U.S. Cl.
CPC ............ *G01S 7/497* (2013.01); *B60S 1/02* (2013.01); *B60W 50/02* (2013.01);
(Continued)

(58) Field of Classification Search
CPC .. G01S 7/497; G01S 17/931; B60W 60/0015; B60W 2255/00; G01N 21/94; G01N 2021/945; G01N 2201/06113
See application file for complete search history.

(56) References Cited

U.S. PATENT DOCUMENTS 689,788 A 12/1901 Bryan
3,947,131 A 3/1976 Karl
(Continued)

FOREIGN PATENT DOCUMENTS

| GB | 2076962 A | 12/1981 |
|---|---|---|
| WO | 2005064315 A1 | 7/2005 |
| WO | 2019206596 A1 | 10/2019 |

OTHER PUBLICATIONS

Erik Skibsted, On-line bioprocess monitoring with a multi-wavelength fluorescence sensor using multivariate calibration, 2000, Elsevier, Journal of Biotechnology 88 (2001) 47-57 (Year: 2000).
(Continued)

*Primary Examiner* — Tan Q Nguyen
(74) *Attorney, Agent, or Firm* — Botos Churchill IP Law

(57) ABSTRACT

The technology relates to detecting water or fouling on the exterior surface of a sensor cover, for instance due to precipitation or debris (fouling). Such objects on the sensor cover surface may degrade operation of the sensor, which can be problematic for vehicles operating in an autonomous driving mode. According to an aspect of the technology, a waveguide layer is provided on the sensor cover. A laser emits light at a selected wavelength along one side of the waveguide layer. The light waveform propagating along the waveguide layer is affected (distorted) by precipitation and/or fouling on the surface of this layer. A detector receives the distorted waveform. The system determines whether water and/or fouling is present based on the received waveform. This allows the system to determine whether to activate a cleaning module or to factor in the information when processing received sensor data.

20 Claims, 22 Drawing Sheets

(51) Int. Cl.
  *B60W 50/02* (2012.01)
  *B60W 60/00* (2020.01)
  *G01N 21/94* (2006.01)
  *G01S 17/931* (2020.01)

(52) U.S. Cl.
  CPC ......... *B60W 60/0015* (2020.02); *G01N 21/94* (2013.01); *G01S 17/931* (2020.01); *B60W 2555/00* (2020.02); *G01N 2021/945* (2013.01); *G01N 2201/06113* (2013.01); *G01S 2007/4975* (2013.01)

(56) References Cited

U.S. PATENT DOCUMENTS

| | | | |
|---|---|---|---|
| 4,468,120 | A | 8/1984 | Tanimoto et al. |
| 4,605,302 | A | 8/1986 | Loefgren et al. |
| 4,652,745 | A | 3/1987 | Zanardelli |
| 4,808,813 | A | 2/1989 | Champetier |
| 5,196,901 | A | 3/1993 | Champetier |
| 6,108,084 | A | 8/2000 | Winner |
| 6,376,824 | B1 | 4/2002 | Michenfelder et al. |
| 6,940,554 | B2 | 9/2005 | Robins et al. |
| 7,397,560 | B2 | 7/2008 | Seaward et al. |
| 7,602,485 | B2 | 10/2009 | Mori |
| 7,948,617 | B2 | 5/2011 | Shubinsky et al. |
| 8,349,605 | B1 | 1/2013 | Lear et al. |
| 8,570,374 | B2 | 10/2013 | Betham et al. |
| 8,643,843 | B2 | 2/2014 | Hulm et al. |
| 9,939,730 | B2 | 4/2018 | Pauls et al. |
| 10,146,376 | B2 | 12/2018 | Wassvik et al. |
| 10,161,886 | B2 | 12/2018 | Ohlsson et al. |
| 10,168,423 | B2 | 1/2019 | Lombrozo et al. |
| 10,421,439 | B2 | 9/2019 | Hansen et al. |
| 10,488,494 | B2 * | 11/2019 | Nichols ................ G01S 17/931 |
| 10,496,227 | B2 | 12/2019 | Wassvik et al. |
| 10,632,507 | B2 | 4/2020 | Nabavi |
| 10,641,877 | B2 | 5/2020 | Lombrozo et al. |
| 10,852,254 | B2 * | 12/2020 | Kashu ................ H01M 50/403 |
| 2007/0035954 | A1 | 2/2007 | Schanz et al. |
| 2010/0147067 | A1 | 6/2010 | Backes |
| 2012/0292481 | A1 | 11/2012 | Hutchin |
| 2017/0225660 | A1 | 8/2017 | Trebouet et al. |
| 2018/0284017 | A1 | 10/2018 | Grinderslev et al. |
| 2020/0142041 | A1 | 5/2020 | Gassend et al. |
| 2020/0284883 | A1 | 9/2020 | Ferreira et al. |
| 2025/0123399 | A1 * | 4/2025 | Hynecek ................ G01J 1/0492 |

OTHER PUBLICATIONS

Kevin Matzen, All Weather Perception: Joint Data Association, Tracking, and Classication for Autonomous Ground Vehicles, 2016, Cornell University, 1-35 (Year: 2016).

Rinky Sha, Ultra-sensitive phenol sensor based on overcoming surface fouling of reduced graphene oxide-zinc oxide composite electrode, 2016, Elsevier, Journal of Electroanalytical Chemistry, 785 (2017) 26-32 (Year: 2016).

Gu, et al., Dirty Glass: Rendering Contamination on Transparent Surfaces, Eurographics Symposium on Rendering, 2007, 12 pages.

* cited by examiner

100

120

140

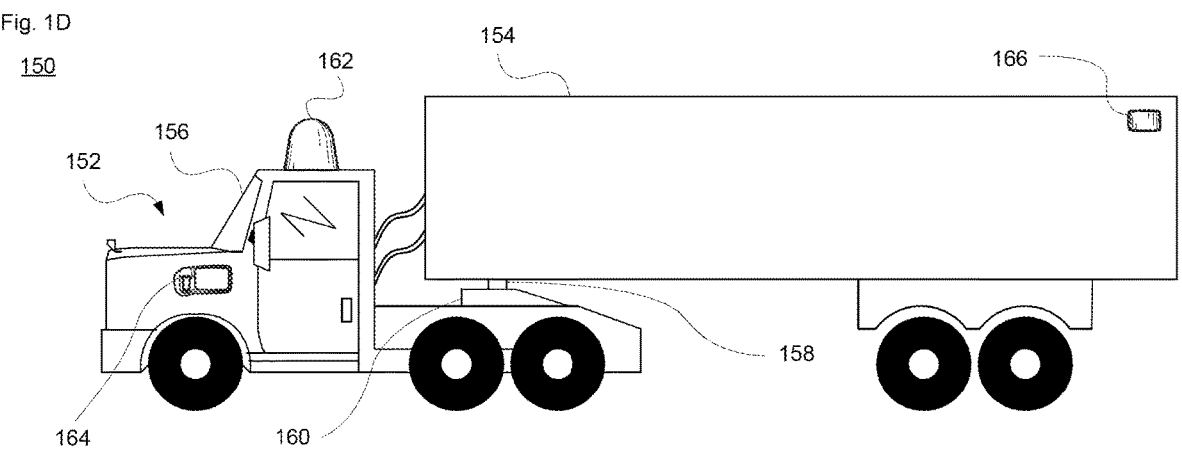

170

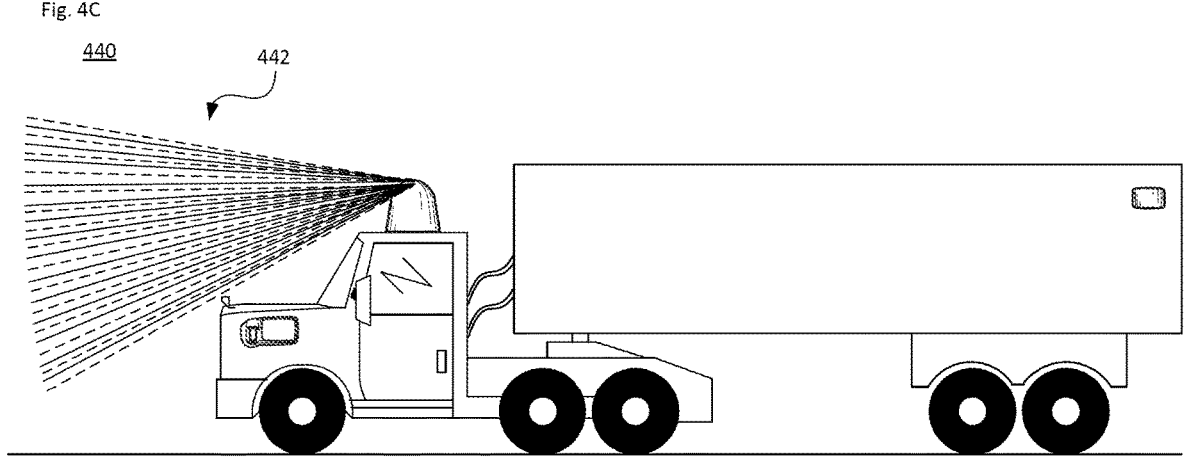

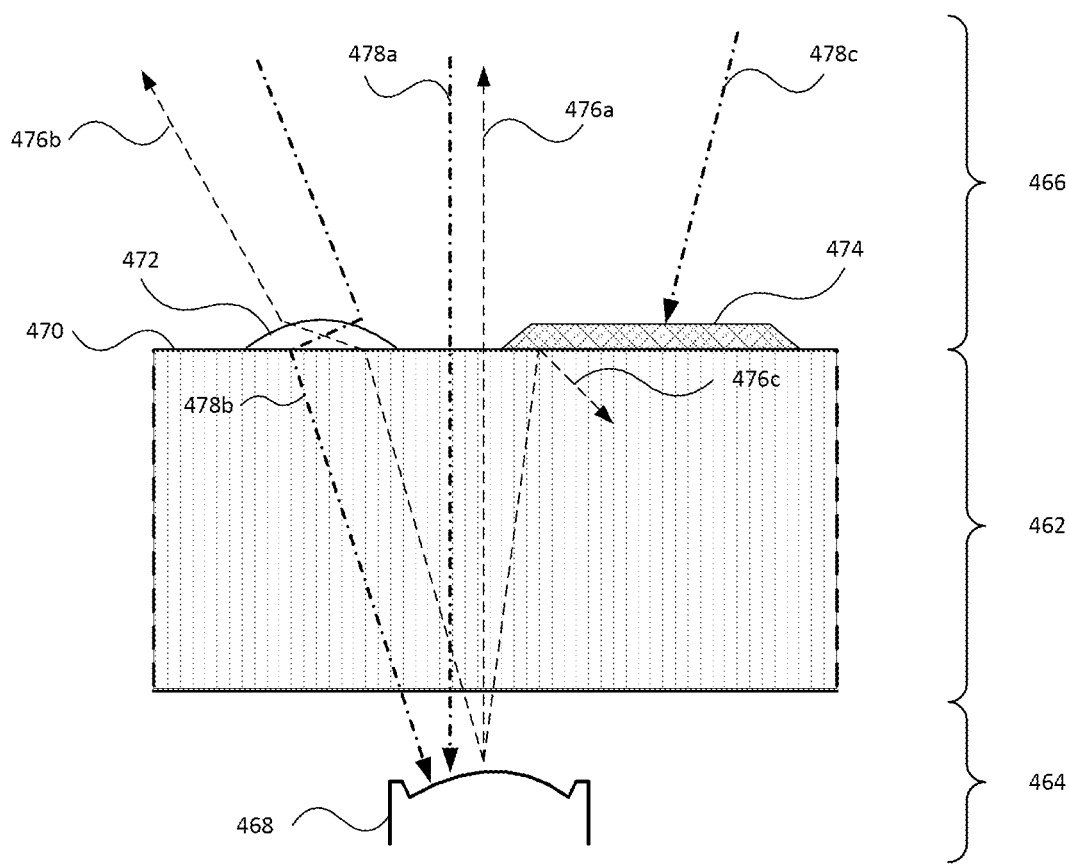

540

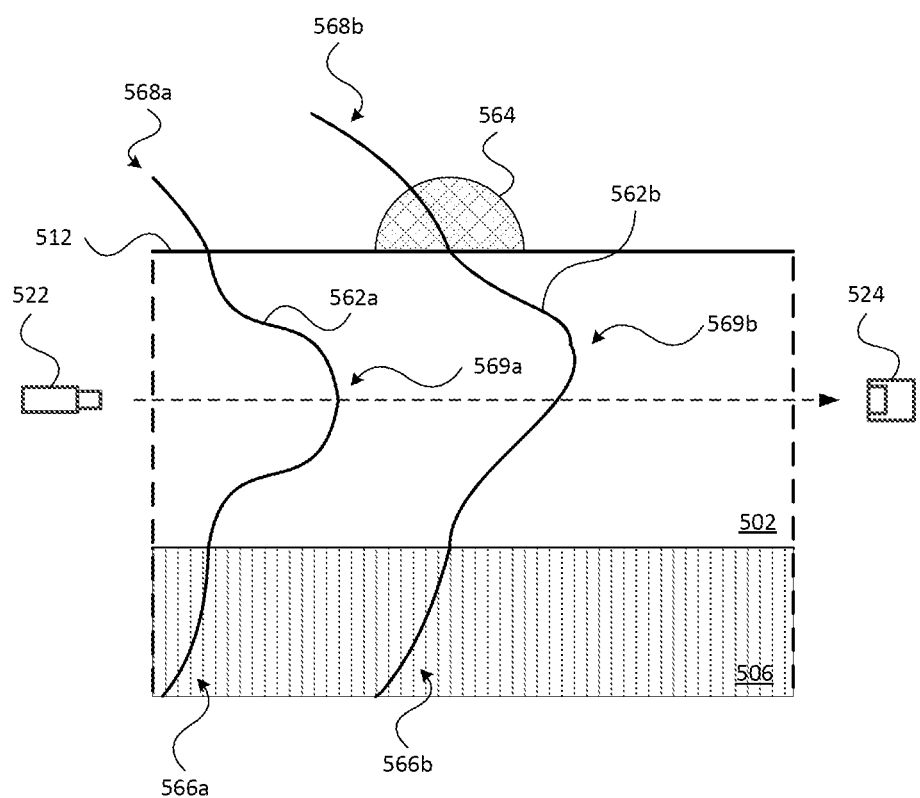

570

592

SURFACE FOULING DETECTION

CROSS-REFERENCE TO RELATED APPLICATIONS

This application is a continuation of U.S. application Ser. No. 17/029,123, filed Sep. 23, 2020, the entire disclosure of which is incorporated herein by reference.

BACKGROUND

Self-driving vehicles that operate in an autonomous driving mode may transport passengers, cargo or other items from one location to another. During operation, sensors of a perception system provide real-time information about other objects in the environment. Signals received by sensors located onboard a vehicle may be degraded due to various reasons, including water, ice, dirt or fouling such as debris on the lens or cover of the sensor. Degradation of the received signals can limit the ability of the perception system to detect objects in the surrounding environment, which may adversely impact the ability of the vehicle to operate in a self-driving mode or to provide warnings to a driver in a manual driving mode.

BRIEF SUMMARY

The technology relates to detecting water or fouling on the surface of a sensor aperture or other window of the sensor, for instance due to precipitation (e.g., water, ice or snow) or dirt, mud or other debris. Water or fouling on the sensor surface may limit or entirely prevent operation of the sensor. This can be especially problematic for vehicles operating in a partial or fully autonomous driving mode. Detecting the presence of water or fouling allows the vehicle to determine when to activate a cleaning system, such as a wiper or liquid or air-based spray cleaning system. While it may be possible to infer the presence of material on the sensor by processing received sensor data, direct detection as discussed herein provides an efficient and effective solution to the water/fouling problem.

According to one aspect, a sensor assembly comprises a base layer, a sensor device, a waveguide layer, an emitter device and a detector device. The base layer is configured to pass signals of one or more wavelengths therethrough. The base layer has a first surface and a second surface opposite the first surface. The sensor device is configured to perform at least one of emit or receive signals of the one or more wavelengths through the base layer. The sensor device is disposed along the first surface of the base layer. The waveguide layer has a first surface and a second surface opposite the first surface, with the first surface of the waveguide layer being adjacent to the second surface of the base layer. The waveguide layer has a waveguide pattern extending between a first side and a second side of the waveguide layer. The emitter device is operatively coupled to the first side of the waveguide layer. The emitter device is configured to emit a signal of a selected wavelength having a first waveform for propagation along the waveguide pattern. The detector device is operatively coupled to the second side of the waveguide layer. The detector device is configured to receive the signal having a second waveform, the second waveform being a modified version of the first waveform when an object is disposed along the second surface of the waveguide layer.

In one scenario, the sensor assembly further comprises a controller operatively coupled to the emitter device and the detector device. The controller is configured to detect whether the object is disposed along the second surface of the waveguide layer based on an evaluation of the second waveform. The controller may be configured to determine whether the object is precipitation or fouling based on the evaluation of the second waveform.

The signal of the selected wavelength may be an optical or infrared signal. The emitter device may be a laser. The base layer may be glass. The waveguide layer may either be etched into or deposited onto the second surface of the base layer.

In one example, the waveguide layer comprises a uniform layer of a high index material having a higher index than the base layer. Here, the waveguide layer may function as a single mode waveguide. The selected wavelength may be chosen to not interfere with the one or more wavelengths emitted or received by the sensor device.

In another example, the emitter device is disposed adjacent to the first side of the waveguide layer and the detector device is disposed adjacent to the second side of the waveguide layer. In a further example, the emitter device is positioned remote from the first side of the waveguide layer and connected to the first end via a first optical coupling member, and the detector device is positioned remote from the second side of the waveguide layer and connected to the second end via a second optical coupling member.

In yet another example, the emitter device includes a first emitter element operatively coupled to the first side of the waveguide layer and a second emitter element operatively coupled to a third side of the waveguide layer, the third side being disposed between the first and the second sides. Here, the detector device includes a first detector element operatively coupled to the second side of the waveguide layer and a second detector element operatively coupled to a fourth side of the waveguide layer, the fourth side being opposite the third side. The first emitter element is configured to emit a first signal of a first selected wavelength having the first waveform for propagation along the waveguide pattern. The second emitter element is configured to emit a second signal of a second selected wavelength having a third waveform for propagation along the waveguide pattern. The first detector element is configured to receive the first signal having the second waveform. And the second detector element is configured to receive the second signal having a fourth waveform, the fourth waveform being a modified version of the second waveform when an object is disposed along the second surface of the waveguide layer. In this case, the sensor assembly may further comprise a controller operatively coupled to the first and second emitter elements and the first and second detector elements, with the controller being configured to detect a location of the object along the second surface of the waveguide layer based on an evaluation of the second and fourth waveforms.

In another example, the sensor assembly further comprises a cleaning module operatively arranged with the second surface of the waveguide layer, wherein the cleaning module is configured to perform a cleaning operation upon detection of precipitation or fouling along the second surface of the waveguide layer based on the signal having the second waveform.

According to another aspect, a vehicle comprises a control system and a perception system. The control system has one or more processors configured to operate the vehicle in an autonomous driving mode based on objects and conditions in an environment external to the vehicle. The perception system is operatively coupled to the control system. The perception system is configured to detect one or more of the objects and conditions in the environment external to the vehicle. The perception system includes the sensor assembly in any of the configurations described above, disposed along an exterior region of the vehicle.

According to yet another aspect, a method is provided for detecting presence of precipitation or fouling on a sensor assembly, the sensor assembly having a base layer that is configured to pass signals of one or more wavelengths therethrough, a sensor device arranged adjacent to a first surface of the base layer and configured to perform at least one of emit or receive signals of the one or more wavelengths through the base layer, and a waveguide layer having a waveguide pattern disposed along a second surface of the base layer opposite the first surface, the method comprising: emitting, by an emitter device operatively coupled to a first side of the waveguide layer, a signal of a selected wavelength having a first waveform for propagation along the waveguide pattern; receiving, by a detector device operatively coupled to a second side of the waveguide layer, a second waveform, the second waveform being a modified version of the first waveform when an object is disposed along an exterior surface of the waveguide layer; and determining, by a processing device, whether the object is precipitation or fouling based on an evaluation of the second waveform.

In one example, upon determining that the object is precipitation or fouling along the exterior surface of the waveguide layer, the method includes activating a cleaning module to perform a cleaning operation of a sensor window of the sensor assembly. In another example, determining whether the object is precipitation or fouling includes identifying a change from the first waveform to the second waveform relative to a baseline. And in a further example, determining whether the object is precipitation or fouling includes evaluating the second waveform against one or more pre-characterized signals.

BRIEF DESCRIPTION OF THE DRAWINGS

FIGS. 1D-E illustrate example cargo-type vehicles configured for use with aspects of the technology.

FIGS. 4A-D illustrates example sensor fields of view and return signals in accordance with aspects of the disclosure.

FIGS. 5A-G illustrate waveguide configurations in accordance with aspects of the disclosure.

DETAILED DESCRIPTION

According to the technology, a waveguide layer is provided on the sensor surface (e.g., on a lens cover or window in front of the sensor). This waveguide layer may be deposited as a thin, uniform layer of a high index material. A laser emits light at a selected wavelength along one side of the waveguide layer. The light propagating along the waveguide layer is affected (distorted) by precipitation and/ or fouling on the surface of this layer. A detector receives the resultant light, and the system determines whether water and/or fouling is present, an amount of such material, and how to address its presence.

Such an approach, which is detailed below, provides direct measurement of the fouling or water in the portion of a window that is being "looked-through" by another sensor that is detecting objects and conditions in the external environment. This does not require window platform space to be occupied by a dedicated sensor. It does not require fouling/water sensing hardware to be in the optical path of the sensor that is looking through the window. In addition, the system provides for decoupling of the fouling/water sensing electronics from the window itself through a fiber-optic cabling arrangement, which means that the fouling/ water sensor module can be located remotely from the window. This enables the system to be employed in sensor assemblies at various locations along the vehicle, and to be used with sensor units having small form factors. While the technology is particularly beneficial to vehicles operating in an autonomous driving mode, it can also be applied to other sensor system and arrangements that can be used in adverse environmental conditions.

Example Vehicle Systems

Figure 1A:
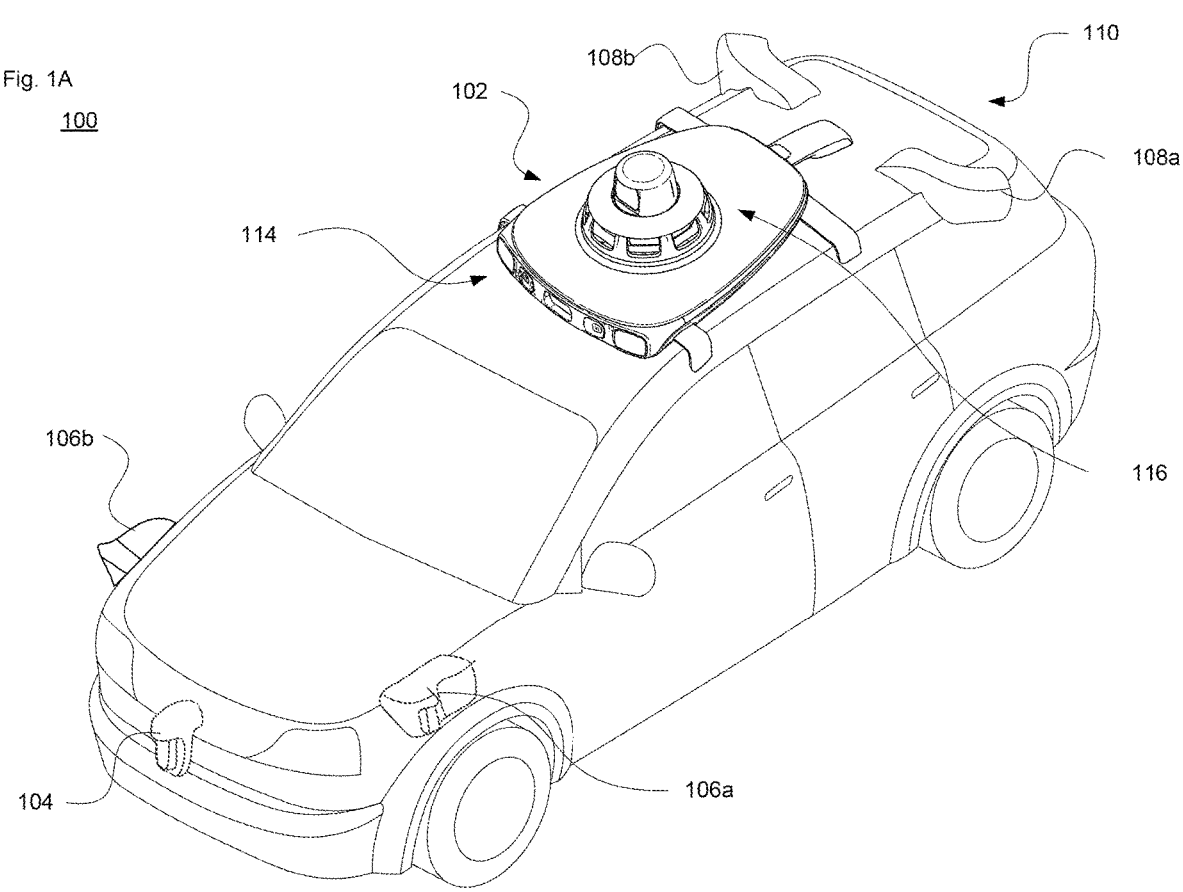
FIGS. 1A-C illustrate example self-driving vehicles in accordance with aspects of the technology.
Figure 1B:
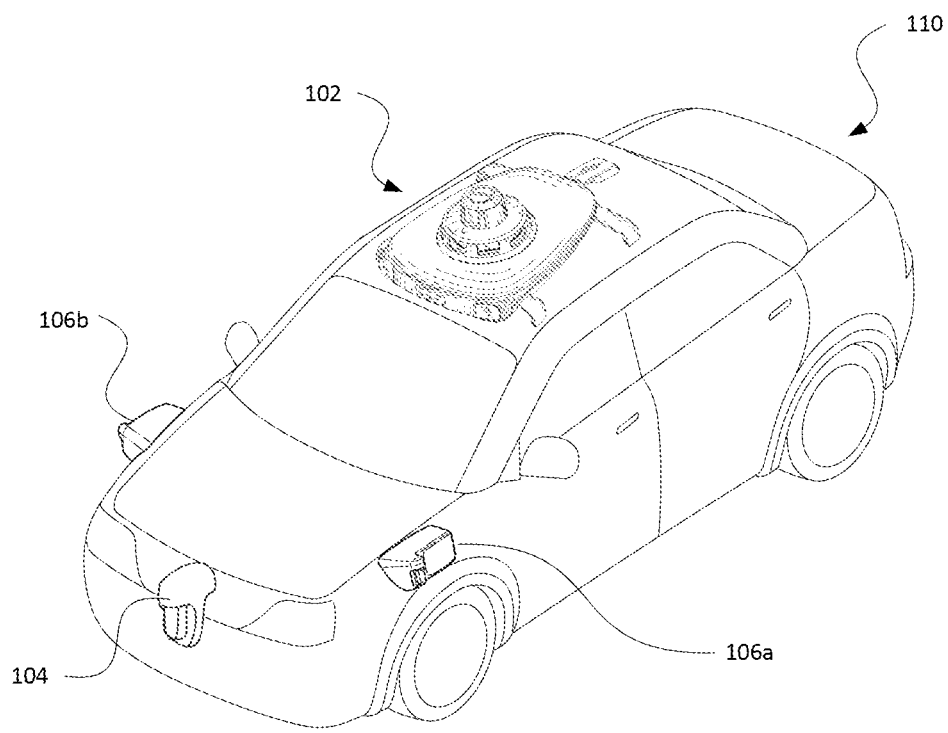
Figure 1C:
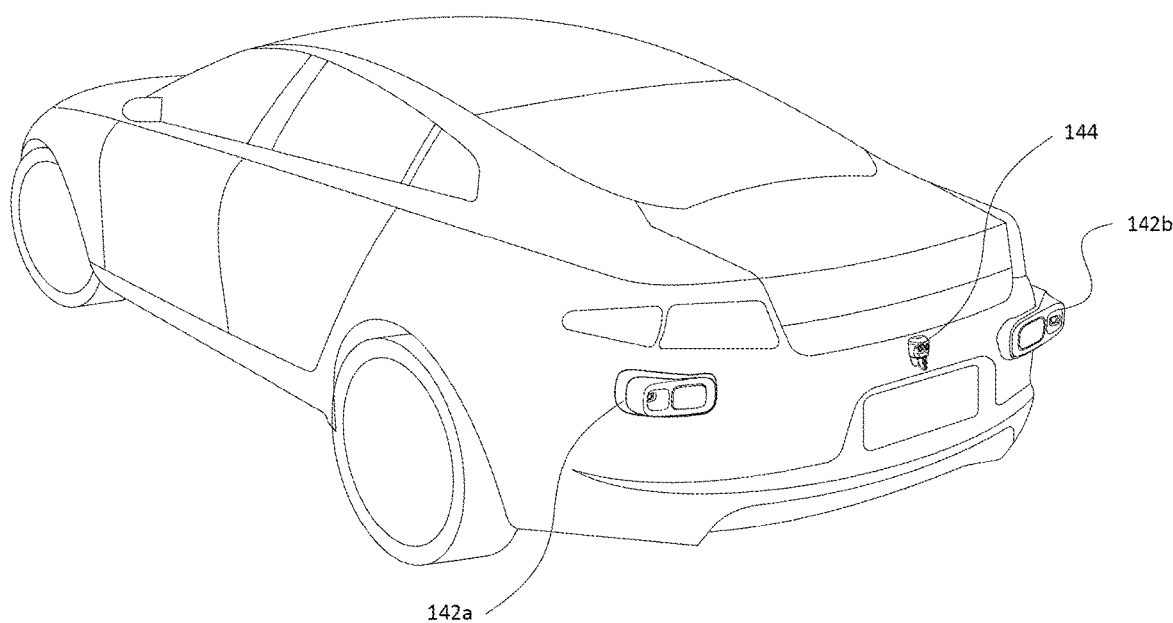

FIG. 1A illustrates a perspective view of an example passenger vehicle 100, such as a minivan or sport utility vehicle (SUV). FIG. 1B illustrates a perspective view of another example passenger vehicle 120, such as a sedan. And FIG. 1C illustrates a rear perspective view of another example passenger vehicle 140.

The passenger vehicles may include various sensors for obtaining information about the vehicle's external environment. For instance, a roof-top housing unit (roof pod assembly) 102 may include a lidar sensor as well as various cameras (e.g., optical or infrared), radar units, acoustical sensors (e.g., microphone or sonar-type sensors), inertial (e.g., accelerometer, gyroscope, etc.) or other sensors (e.g., positioning sensors such as GPS sensors). Housing 104, located at the front end of vehicle 100, and housings 106a, 106b on the driver's and passenger's sides of the vehicle may each incorporate lidar, radar, camera and/or other sensors. For example, housing 106a may be located in front of the driver's side door along a quarter panel of the vehicle. As shown, the passenger vehicle 100 also includes housings 108a, 108b for radar units, lidar and/or cameras also located towards the rear roof portion of the vehicle. Additional lidar, radar units and/or cameras (not shown) may be located at other places along the vehicle 100. For instance, arrow 110 indicates that a sensor unit (not shown) may be positioned along the rear of the vehicle 100, such as on or adjacent to the bumper. This can be seen in FIG. 1C, where sensor housings 142a and 142b are arranged along the left and right sides of the bumper, while the assembly of sensor housing 144 is disposed centrally at the rear of the vehicle.

Arrow 114 in FIG. 1A indicates that the roof pod 102 as shown includes a base section coupled to the roof of the vehicle. And arrow 116 indicated that the roof pod 102 also includes an upper section raised above the base section. Each of the base section and upper section may house different sensor units configured to obtain information about objects and conditions in the environment around the vehicle. The roof pod 102 and other sensor housings may also be disposed along vehicle 120 of FIG. 1B (e.g., a sedan). By way of example, each sensor unit may include one or more sensors of the types described above, such as lidar, radar, camera (e.g., optical or infrared), acoustical (e.g., a passive microphone or active sound emitting sonar-type sensor), inertial (e.g., accelerometer, gyroscope, etc.) or other sensors (e.g., positioning sensors such as GPS sensors).

Figure 1E:
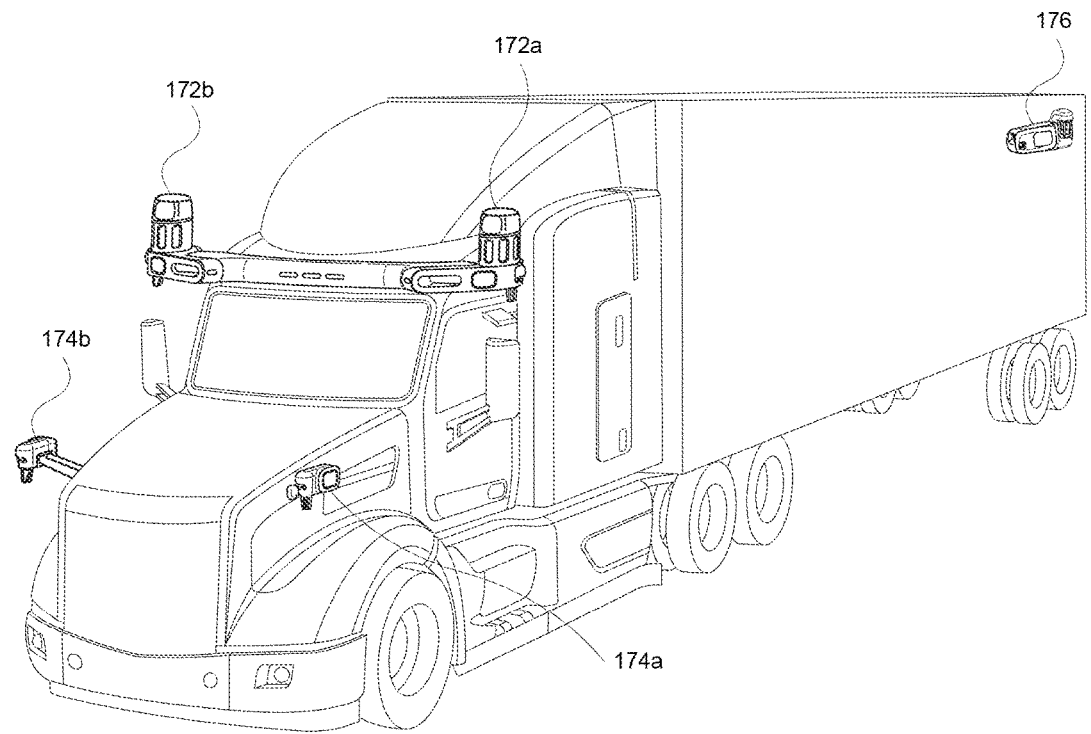

FIGS. 1D and 1E illustrate example cargo vehicles 150 and 170, respectively, such as tractor-trailer trucks. A given cargo vehicle may include, e.g., a single, double or triple trailer, or may be another medium or heavy duty truck such as in commercial weight classes 4 through 8. As shown in FIG. 1D, this truck includes a tractor unit 152 and a single cargo unit or trailer 154. The trailer 154 may be fully enclosed, open such as a flat bed, or partially open depending on the type of cargo to be transported. In this example, the tractor unit 152 includes the engine and steering systems (not shown) and a cab 156 for a driver and any passengers.

The trailer 154 includes a hitching point, known as a kingpin, 158. The kingpin 158 is typically formed as a solid steel shaft, which is configured to pivotally attach to the tractor unit 152. In particular, the kingpin 158 attaches to a trailer coupling 160, known as a fifth-wheel, that is mounted rearward of the cab. For a double or triple tractor-trailer, the second and/or third trailers may have simple hitch connections to the leading trailer. Or, alternatively, each trailer may have its own kingpin. In this case, at least the first and second trailers could include a fifth-wheel type structure arranged to couple to the next trailer.

As shown, the tractor may have one or more sensor units 162, 164 disposed therealong. For instance, one or more sensor units 162 may be disposed on a roof or top portion of the cab 156, and one or more side sensor units 164 may be disposed on left and/or right sides of the cab 156. Sensor units may also be located along other regions of the cab 156, such as along the front bumper or hood area, in the rear of the cab, adjacent to the fifth-wheel, underneath the chassis, etc. The trailer 154 may also have one or more sensor units 166 disposed therealong, for instance along a side panel, front, rear, roof and/or undercarriage of the trailer 154. Similarly, along the example truck 170 of FIG. 1E, the tractor may have a distributed set of sensor units 172a,b disposed on a roof or top portion of the cab, and side sensor units 174a,b disposed on left and/or right sides of the cab. In this example, the trailer may also have one or more sensor units 176 disposed therealong, for instance along a side panel as shown.

As with the sensor units of the passenger vehicle of FIGS. 1A-B, each sensor unit of the cargo vehicle or the articulating vehicle may include one or more sensors, such as lidar, radar, camera (e.g., optical or infrared), acoustical (e.g., microphone or sonar-type sensor), inertial (e.g., accelerometer, gyroscope, etc.) or other sensors (e.g., positioning sensors such as GPS sensors). While certain aspects of the disclosure may be particularly useful in connection with specific types of vehicles, the vehicle may be different types of vehicle including, but not limited to, cars, motorcycles, cargo vehicles, buses, recreational vehicles, emergency vehicles, construction equipment, etc.

There are different degrees of autonomy that may occur for a vehicle operating in a partially or fully autonomous driving mode. The U.S. National Highway Traffic Safety Administration and the Society of Automotive Engineers have identified different levels to indicate how much, or how little, the vehicle controls the driving. For instance, Level 0 has no automation and the driver makes all driving-related decisions. The lowest semi-autonomous mode, Level 1, includes some drive assistance such as cruise control. At this level, the vehicle may operate in a strictly driver-information system without needing any automated control over the vehicle. Here, the vehicle's onboard sensors, relative positional knowledge between them, and a way for them to exchange data, can be employed to implement aspects of the technology as discussed herein. Level 2 has partial automation of certain driving operations, while Level 3 involves conditional automation that can enable a person in the driver's seat to take control as warranted. In contrast, Level 4 is a high automation level where the vehicle is able to drive without assistance in select conditions or situations. And Level 5 is a fully autonomous mode in which the vehicle is able to drive without assistance in all situations. The architectures, components, systems and methods described herein can function in any of the semi or fully-autonomous modes, e.g., Levels 1-5, which are referred to herein as autonomous driving modes. Thus, reference to an autonomous driving mode includes both partial and full autonomy.

Figure 2:
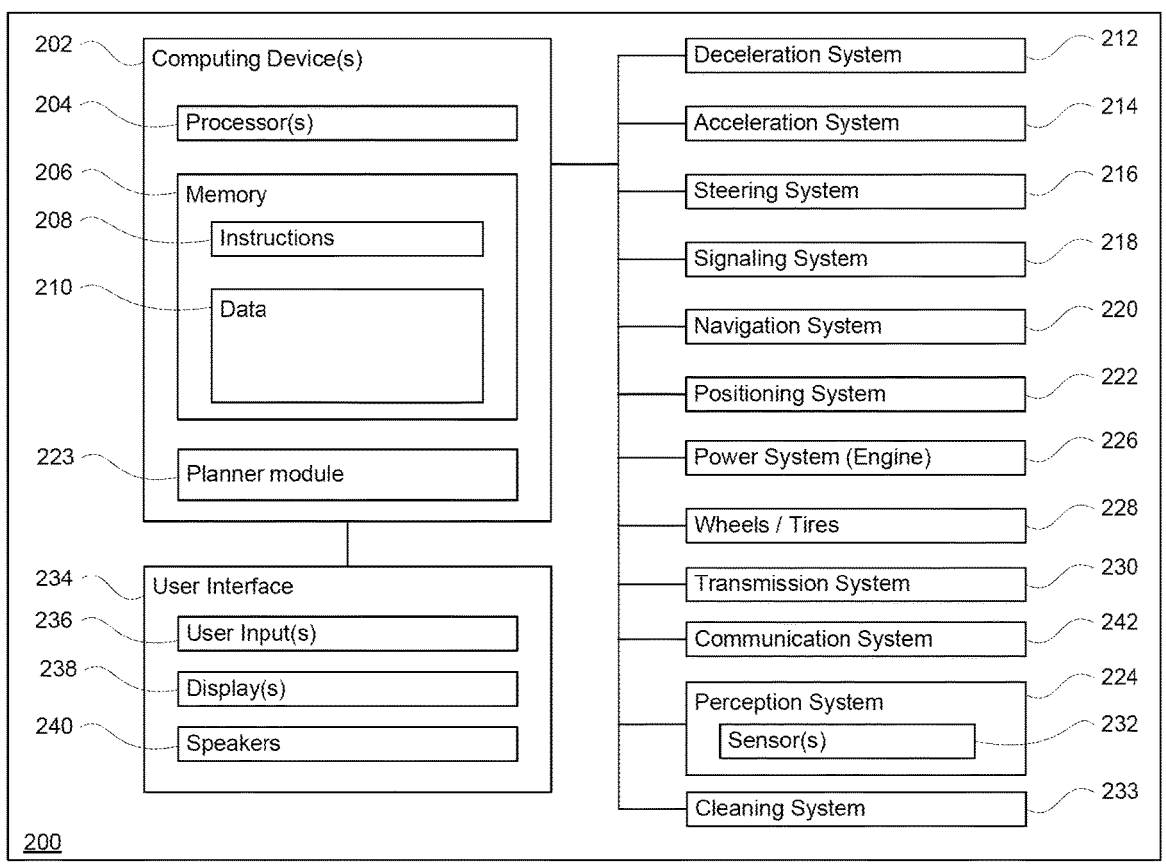
FIG. 2 illustrates components of a self-driving vehicle in accordance with aspects of the technology.

FIG. 2 illustrates a block diagram 200 with various components and systems of an exemplary vehicle, such as passenger vehicles 100, 120 and 140, to operate in an autonomous driving mode. As shown, the block diagram 200 includes one or more computing devices 202, such as computing devices containing one or more processors 204, memory 206 and other components typically present in general purpose computing devices. The memory 206 stores information accessible by the one or more processors 204, including instructions 208 and data 210 that may be executed or otherwise used by the processor(s) 204. The computing system may control overall operation of the vehicle when operating in an autonomous driving mode.

The memory 206 stores information accessible by the processors 204, including instructions 208 and data 210 that may be executed or otherwise used by the processors 204. For instance, the memory may include one or more models to perform self-reflection filtering, including one or more models of the vehicle. The memory 206 may be of any type capable of storing information accessible by the processor, including a computing device-readable medium. The memory is a non-transitory medium such as a hard-drive, memory card, optical disk, solid-state, etc. Systems may include different combinations of the foregoing, whereby different portions of the instructions and data are stored on different types of media.

The instructions 208 may be any set of instructions to be executed directly (such as machine code) or indirectly (such as scripts) by the processor(s). For example, the instructions may be stored as computing device code on the computing device-readable medium. In that regard, the terms "instructions", "modules" and "programs" may be used interchangeably herein. The instructions may be stored in object code format for direct processing by the processor, or in any other computing device language including scripts or collections of independent source code modules that are interpreted on demand or compiled in advance. The data 210 may be retrieved, stored or modified by one or more processors 204 in accordance with the instructions 208. In one example, some or all of the memory 206 may be an event data recorder or other secure data storage system configured to store vehicle diagnostics, detected sensor data and/or precipitation/fouling information, which may be on board the vehicle or remote, depending on the implementation.

The processors 204 may be any conventional processors, such as commercially available CPUs or GPUs. Alternatively, each processor may be a dedicated device such as an ASIC or other hardware-based processor. Although FIG. 2 functionally illustrates the processors, memory, and other elements of computing devices 202 as being within the same block, such devices may actually include multiple processors, computing devices, or memories that may or may not be stored within the same physical housing. Similarly, the memory 206 may be a hard drive or other storage media located in a housing different from that of the processor(s) 204. Accordingly, references to a processor or computing device will be understood to include references to a collection of processors or computing devices or memories that may or may not operate in parallel.

In one example, the computing devices 202 may form an autonomous driving computing system incorporated into vehicle 100. The autonomous driving computing system may be capable of communicating with various components of the vehicle. For example, the computing devices 202 may be in communication with various systems of the vehicle, including a driving system including a deceleration system 212 (for controlling braking of the vehicle), acceleration system 214 (for controlling acceleration of the vehicle), steering system 216 (for controlling the orientation of the wheels and direction of the vehicle), signaling system 218 (for controlling turn signals), navigation system 220 (for navigating the vehicle to a location or around objects) and a positioning system 222 (for determining the position of the vehicle, e.g., including the vehicle's pose, e.g., position and orientation along the roadway or pitch, yaw and roll of the vehicle chassis relative to a coordinate system). The autonomous driving computing system may employ a planner module 223, in accordance with the navigation system 220, the positioning system 222 and/or other components of the system, e.g., for determining a route from a starting point to a destination or for making modifications to various driving aspects in view of current or expected traction conditions.

The computing devices 202 are also operatively coupled to a perception system 224 (for detecting objects and conditions in the vehicle's surrounding environment), a power system 226 (for example, a battery and/or gas or diesel powered engine) and a transmission system 230 in order to control the movement, speed, etc., of the vehicle in accordance with the instructions 208 of memory 206 in an autonomous driving mode which does not require or need continuous or periodic input from a passenger of the vehicle. Some or all of the wheels/tires 228 are coupled to the transmission system 230, and the computing devices 202 may be able to receive information about tire pressure, balance and other factors that may impact driving in an autonomous mode.

The computing devices 202 may control the direction and speed of the vehicle, e.g., via the planner module 223, by controlling various components. By way of example, computing devices 202 may navigate the vehicle to a destination location completely autonomously using data from the map information and navigation system 220. Computing devices 202 may use the positioning system 222 to determine the vehicle's location and the perception system 224 to detect and respond to objects when needed to reach the location safely. In order to do so, computing devices 202 may cause the vehicle to accelerate (e.g., by increasing fuel or other energy provided to the engine by acceleration system 214), decelerate (e.g., by decreasing the fuel supplied to the engine, changing gears, and/or by applying brakes by deceleration system 212), change direction (e.g., by turning the front or other wheels of vehicle 100 by steering system 216), and signal such changes (e.g., by lighting turn signals of signaling system 218). Thus, the acceleration system 214 and deceleration system 212 may be a part of a drivetrain or other type of transmission system 230 that includes various components between an engine of the vehicle and the wheels of the vehicle. Again, by controlling these systems, computing devices 202 may also control the transmission system 230 of the vehicle in order to maneuver the vehicle autonomously in either a partial or fully autonomous driving mode.

Navigation system 220 may be used by computing devices 202 in order to determine and follow a route to a location. In this regard, the navigation system 220 and/or memory 206 may store map information, e.g., highly detailed maps that computing devices 202 can use to navigate or control the vehicle. As an example, these maps may identify the shape and elevation of roadways, lane markers, intersections, crosswalks, speed limits, traffic signal lights, buildings, signs, real time traffic information, vegetation, or other such objects and information. The lane markers may include features such as solid or broken double or single lane lines, solid or broken lane lines, reflectors, etc. A given lane may be associated with left and/or right lane lines or other lane markers that define the boundary of the lane. Thus, most lanes may be bounded by a left edge of one lane line and a right edge of another lane line.

The perception system 224 includes sensors 232 for detecting objects external to the vehicle. The detected objects may be other vehicles, obstacles in the roadway, traffic signals, signs, trees, etc. The sensors may 232 may also detect certain aspects of weather conditions, such as snow, rain or water spray, or puddles, ice or other materials on the roadway. By way of example only, the perception system 224 may include lidar sensors, radar units, cameras (e.g., optical imaging devices, with or without a neutral-density filter (ND) filter), one or more microphones or other acoustical arrays, positioning sensors (e.g., gyroscopes, accelerometers and/or other inertial components), infrared sensors, and/or any other detection devices that record data which may be processed by computing devices 202.

Such sensors of the perception system 224 may detect objects in the environment outside of the vehicle and their characteristics such as location, orientation relative to the roadway or relative to the vehicle, size, shape, type (for instance, vehicle, pedestrian, bicyclist, etc.), heading, speed of movement relative to the vehicle, etc., as well as environmental conditions around the vehicle. The perception system 224 may also include other sensors within the vehicle to detect objects and conditions within the vehicle, such as in the passenger compartment. For instance, such sensors may detect, e.g., one or more persons, pets, packages, etc., as well as conditions within and/or outside the vehicle such as temperature, humidity, etc. Still further sensors 232 of the perception system 224 may measure the rate of rotation of the wheels 228, an amount or a type of braking by the deceleration system 212, and other factors associated with the equipment of the vehicle itself.

As illustrated in FIGS. 1A-E, certain sensors of the perception system 224 may be incorporated into one or more sensor assemblies or housings. In some examples, these may be integrated into front, rear or side perimeter sensor assemblies around the vehicle (e.g., units 104 and 106). In another example, other sensors may be part of the roof-top housing (roof pod) 102. The computing devices 202 may communicate with the sensor assemblies located on or otherwise distributed along the vehicle. Each assembly may have one or more types of sensors such as those described above.

The raw data obtained by the sensors, as well as information about the sensors themselves, can be processed by the perception system 224 (such as via a processing chip of the sensor or incorporated into a sensor assembly module) and/or sent for further processing to the computing devices 202 periodically or continuously as the data is generated by the perception system 224. A cleaning system 233 may be separate from or integrated into the perception system 224.

By way of example, the cleaning system 233 may include one or more cleaning modules that are associated with individual sensors (e.g., a lidar sensor or camera) or sensor assemblies (e.g., any of the units 102-108 of FIGS. 1A-B, 142-144 of FIG. 1C, 162-166 of FIG. 1D and/or 172-176 of FIG. 1E). Sensor information, including information about fouling, may be used to activate one or more cleaning modules to clean the respective sensors.

Computing devices 202 may use the positioning system 222 to determine the vehicle's location and perception system 224 to detect and respond to objects when needed to reach the location safely, e.g., via adjustments made by planner module 223, including adjustments in operation to deal with occlusions and other issues. In addition, the computing devices 202 may perform validation or calibration of individual sensors, all sensors in a particular sensor assembly, or between sensors in different sensor assemblies or other physical housings.

Computing devices 202 may include all of the components normally used in connection with a computing device such as the processor and memory described above as well as a user interface subsystem 234. The user interface subsystem 234 may include one or more user inputs 236 (e.g., a mouse, keyboard, touch screen and/or microphone) and one or more display devices 238 (e.g., a monitor having a screen or any other electrical device that is operable to display information). In this regard, an internal electronic display may be located within a cabin of the vehicle (not shown) and may be used by computing devices 202 to provide information to passengers within the vehicle. Other output devices, such as speaker(s) 240 may also be located within the passenger vehicle.

The vehicle may also include a communication system 242. For instance, the communication system 242 may also include one or more wireless configurations to facilitate communication with other computing devices, such as passenger computing devices within the vehicle, computing devices external to the vehicle such as in other nearby vehicles on the roadway, and/or a remote server system. The network connections may include short range communication protocols such as Bluetooth™, Bluetooth™ low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Figure 3A:
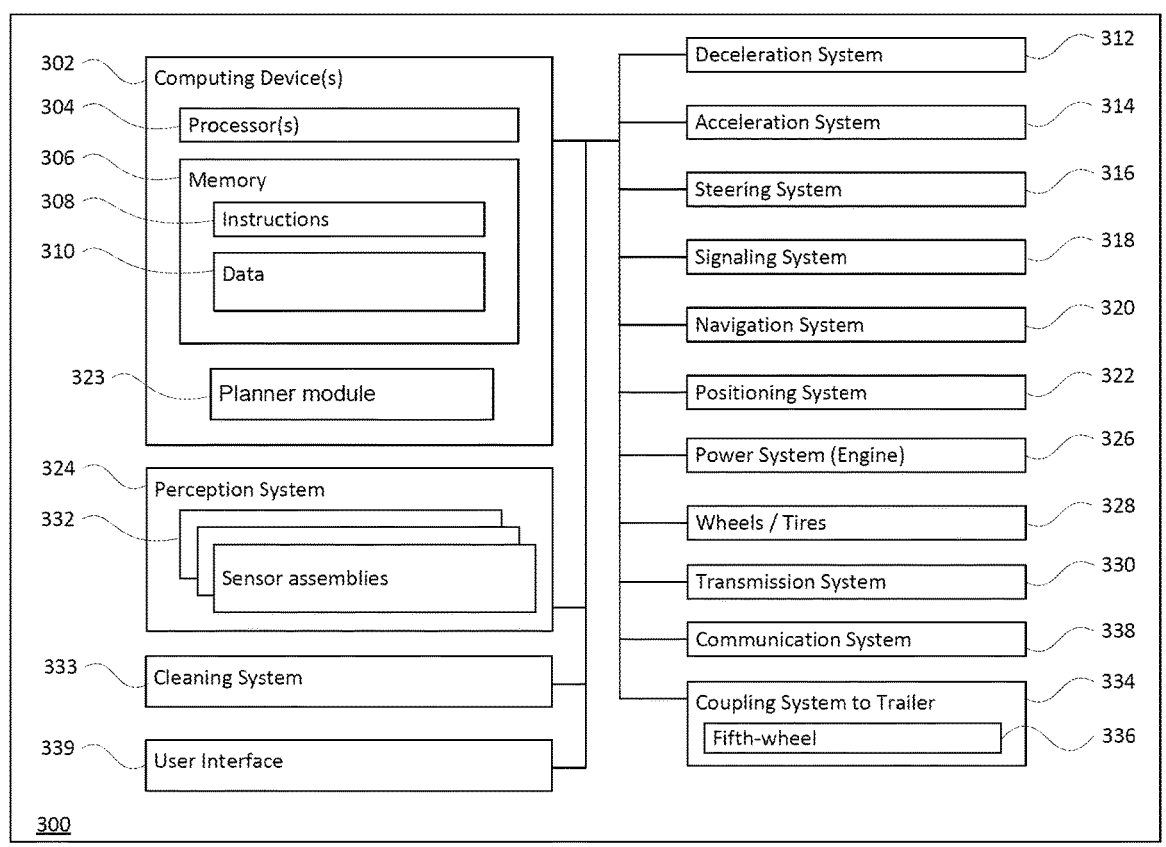
FIGS. 3A-B are block diagrams of systems of an example cargo-type vehicle in accordance with aspects of the technology.

FIG. 3A illustrates a block diagram 300 with various components and systems of a large vehicle, e.g., vehicle 150 or 170 of FIGS. 1D-E. By way of example, the vehicle may be a truck or bus, farm, emergency or construction equipment, or the like, configured to operate in one or more autonomous modes of operation. As shown in the block diagram 300, the vehicle includes a control system of one or more computing devices, such as computing devices 302 containing one or more processors 304, memory 306 and other components similar or equivalent to components 202, 204 and 206 discussed above with regard to FIG. 2.

The control system may constitute an electronic control unit (ECU) of a tractor unit of a cargo vehicle. As with instructions 208, the instructions 308 may be any set of instructions to be executed directly (such as machine code) or indirectly (such as scripts) by the processor. Similarly, the data 310 may be retrieved, stored or modified by one or more processors 304 in accordance with the instructions 308.

In one example, the computing devices 302 may form an autonomous driving computing system incorporated into vehicle 150 or vehicle 170. Similar to the arrangement discussed above regarding FIG. 2, the autonomous driving computing system of block diagram 300 may be capable of communicating with various components of the vehicle in order to perform route planning and driving operations. For example, the computing devices 302 may be in communication with various systems of the vehicle, such as a driving system including a deceleration system 312, acceleration system 314, steering system 316, signaling system 318, navigation system 320 and a positioning system 322, each of which may function as discussed above regarding FIG. 2.

The computing devices 302 are also operatively coupled to a perception system 324, a power system 326 and a transmission system 330. Some or all of the wheels/tires 328 are coupled to the transmission system 330, and the computing devices 302 may be able to receive information about tire pressure, balance, rotation rate and other factors that may impact driving in an autonomous mode. As with computing devices 202, the computing devices 302 may control the direction and speed of the vehicle by controlling various components. By way of example, computing devices 302 may navigate the vehicle to a destination location completely autonomously using data from the map information and navigation system 320. Computing devices 302 may employ a planner module 323, in conjunction with the positioning system 322, the perception system 324 and other subsystems to detect and respond to objects when needed to reach the location safely, similar to the manner described above for FIG. 2.

Similar to perception system 224, the perception system 324 also includes one or more sensors or other components such as those described above for detecting objects external to the vehicle, objects or conditions internal to the vehicle, and/or operation of certain vehicle equipment such as the wheels and deceleration system 312. For instance, as indicated in FIG. 3A the perception system 324 includes one or more sensor assemblies 332. Each sensor assembly 332 includes one or more sensors. In one example, the sensor assemblies 332 may be arranged as sensor towers, e.g., integrated into the side-view mirrors or extending along the cab roof on the truck, farm equipment, construction equipment or the like. Sensor assemblies 332 may also be positioned at different locations on the tractor unit 152 or on the trailer 154, as noted above with regard to FIGS. 1E-F. The computing devices 302 may communicate with the sensor assemblies located on both the tractor unit and the trailer, or along the front and rear portions of the large vehicle. Each assembly may have one or more types of sensors such as those described above.

As noted above with regard to FIG. 2, the raw data obtained by the sensors, as well as information about the sensors themselves, can be processed by the perception system (such as via a processing chip of the sensor or incorporated into a sensor assembly module) and/or sent for further processing to the computing devices periodically or continuously as the data is generated by the perception system. Similarly, a cleaning system 333 may be separate from or integrated into the perception system 324, with the cleaning system 333 including one or more cleaning modules that are associated with individual sensors or sensor assemblies. Sensor information, including information about fouling, may be used to activate one or more cleaning modules to clean the respective sensors.

Also shown in FIG. 3A is a coupling system 334 for connectivity between the tractor unit and the trailer. The coupling system 334 may include one or more power and/or pneumatic connections (not shown), and a fifth-wheel 336 at the tractor unit for connection to the kingpin at the trailer. A communication system 338, equivalent to communication system 242, is also shown as part of vehicle system 300.

Similar to FIG. 2, in this example the cargo truck, bus or other vehicle may also include a user interface subsystem 339. The user interface subsystem 339 may be located within the cabin of the vehicle and may be used by computing devices 202 to provide information to passengers within the vehicle, such as a truck driver who is capable of driving the truck in a manual driving mode.

Figure 3B:
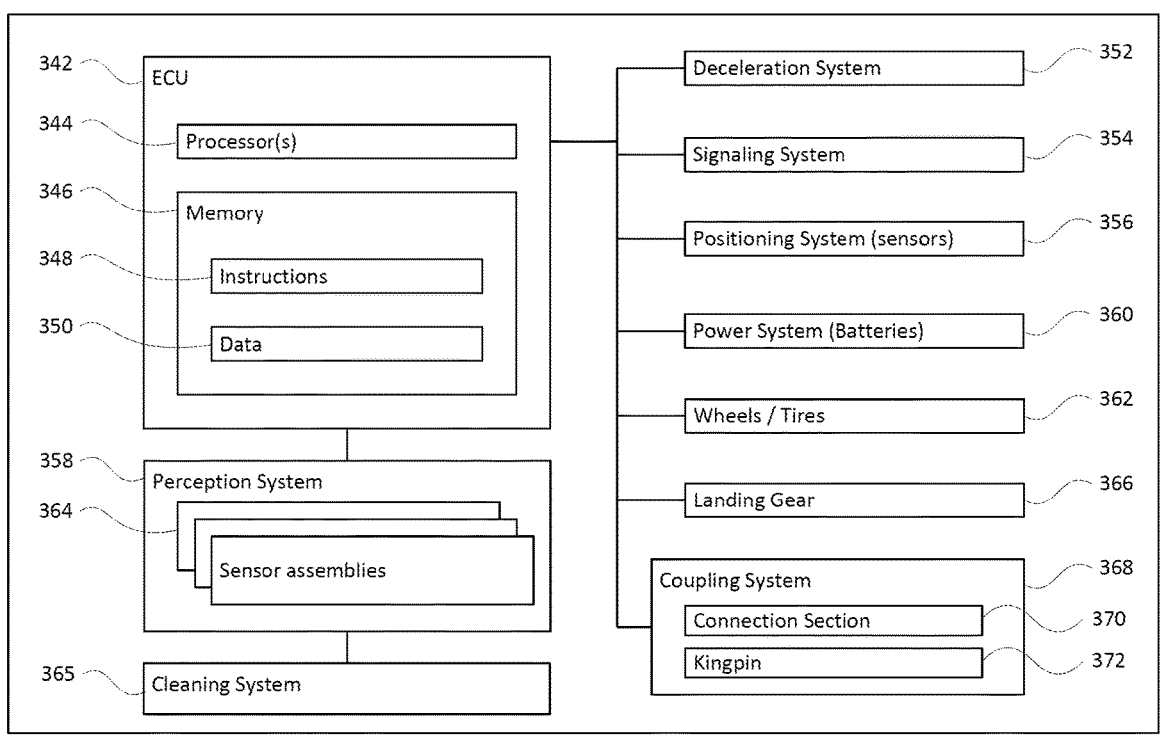

FIG. 3B illustrates an example block diagram 340 of systems of a trailer unit, such as trailer 154 of FIG. 1D. As shown, the system includes an ECU 342 of one or more computing devices, such as computing devices containing one or more processors 344, memory 346 and other components typically present in general purpose computing devices. The memory 346 stores information accessible by the one or more processors 344, including instructions 348 and data 350 that may be executed or otherwise used by the processor(s) 344. The descriptions of the processors, memory, instructions and data from FIGS. 2 and 3A apply to these elements of FIG. 3B.

The ECU 342 is configured to receive information and control signals from the trailer unit. The on-board processors 344 of the ECU 342 may communicate with various systems of the trailer, including a deceleration system 352, signaling system 354, and a positioning system 356. The ECU 342 may also be operatively coupled to a perception system 358 with one or more sensors arranged in sensor assemblies 364 for detecting objects in the trailer's environment. A cleaning system 365 may be separate from or integrated into the perception system 358 and may function as discussed above to clean corresponding sensors or sensor assemblies.

The ECU 342 may also be operatively coupled with a power system 360 (for example, a battery power supply) to provide power to local components. Some or all of the wheels/tires 362 of the trailer may be coupled to the deceleration system 352, and the processors 344 may be able to receive information about tire pressure, balance, wheel speed and other factors that may impact driving in an autonomous mode, and to relay that information to the processing system of the tractor unit. The deceleration system 352, signaling system 354, positioning system 356, perception system 358, power system 360 and wheels/tires 362 may operate in a manner such as described above with regard to FIGS. 2 and 3A.

The trailer also includes a set of landing gear 366, as well as a coupling system 368. The landing gear may provide a support structure for the trailer when decoupled from the tractor unit. The coupling system 368, which may be a part of coupling system 334, provides connectivity between the trailer and the tractor unit. Thus, the coupling system 368 may include a connection section 370 (e.g., for communication, power and/or pneumatic links to the tractor unit). The coupling system also includes a kingpin 372 configured for connectivity with the fifth-wheel of the tractor unit.

Example Implementations

In view of the structures and configurations described above and illustrated in the figures, various aspects will now be described in accordance with aspects of the technology.

As noted above, various sensors may be located at different places around the vehicle to gather data from different parts of the external environment and/or the vehicle itself. Certain sensors may have different fields of view (FOV) of the external environment and/or parts of the vehicle depending on their placement around the vehicle and the type of information they are designed to gather. For instance, different lidar sensors may be used for near (short range) detection of objects adjacent to the vehicle (e.g., with a range of less than 2-10 meters), while others may be used for far (long range) detection of objects a hundred meters (or more or less) in front of the vehicle. Mid-range lidars may also be employed (e.g., a range between 5-150 meters). Multiple radar units may be positioned toward the front or rear of the vehicle for long-range object detection as well as on the sides of the vehicle for perimeter detection of adjacent objects. And cameras may also be arranged in various locations to provide good visibility around the vehicle, including for close-in sensing adjacent to the vehicle.

Depending on the configuration, a set of sensors may be arranged within one housing or distributed in an arrangement around the vehicle to include multiple individual sensors with overlapping fields of view. Alternatively or additionally, other sensors may provide redundant 360° fields of view. In addition to detecting objects in the environment external to the vehicle, these sensors may be used to determine the vehicle's actual pose along a roadway including, e.g., the orientation of the trailer with respect to the tractor unit of a cargo vehicle, or the respective orientations of the front and rear of an articulated bus. This can include orientation information about the state of different sections of the vehicle (e.g., tractor or trailer, front or rear of bus, etc.) in terms of position, roll, pitch, yaw, and associated time derivatives of such state information.

Figure 4A:
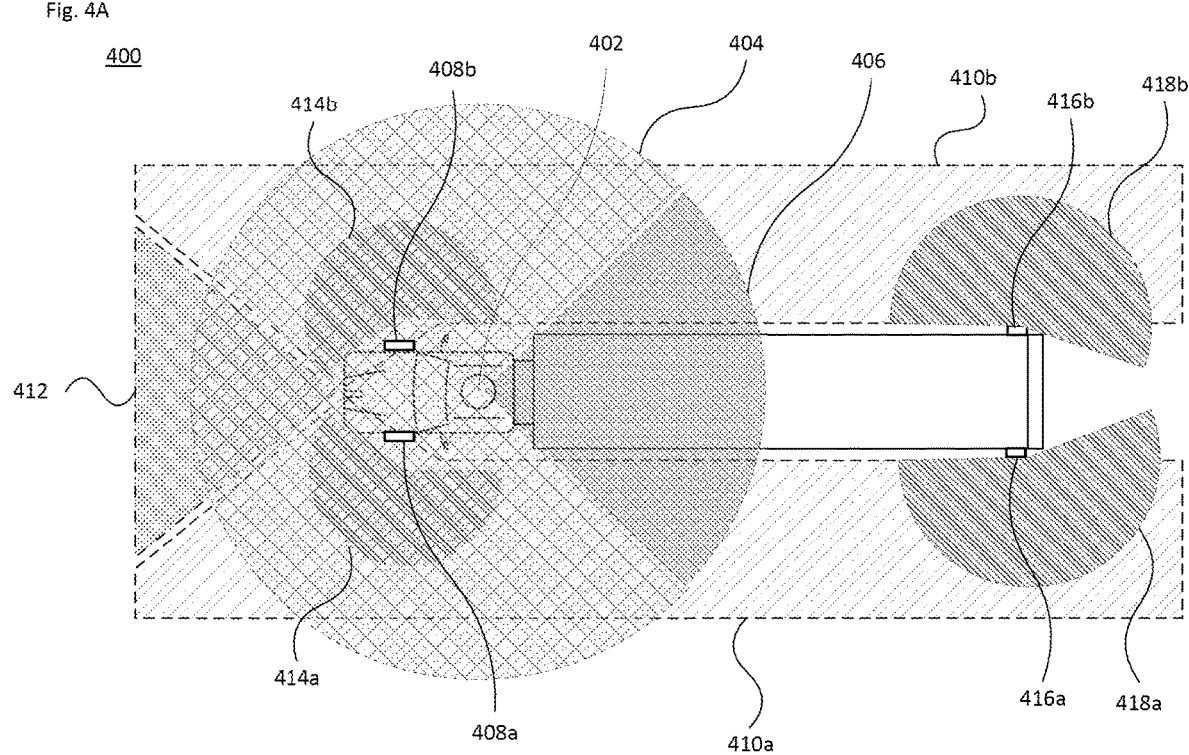

FIG. 4A provides one example 400 of sensor fields of view relating to the sensors, such as those illustrated in FIGS. 1C-D. As illustrated in this example, the lidar(s) in roof pod assembly 402 may have a FOV 404, such as a 360° FOV. Here, as shown by darker region 406, the trailer or other articulating portion of the vehicle may provide signal returns including self-returns, and may partially or fully block a rearward view of the external environment. Long range lidars of left and right side sensor units 408a, 408b of the tractor unit have corresponding FOVs 410a and 410b. These can encompass significant areas adjacent to and along the sides and front of the vehicle. As shown, there may be an overlap region 412 of the fields of view of these various sensors in front of the vehicle. The overlap region 412 may provide the perception system with additional or information about a very important region that is directly in front of the tractor unit. This redundancy also has a safety aspect. Should one of the long range lidar sensors suffer degradation in performance, the redundancy would still allow for operation in an autonomous mode. Short range lidars of the sensor units 408a and 408b have smaller FOVs 414a and 414b, for instance as part of a close-in sensing system to detect objects immediately adjacent to the front portion (e.g., tractor) of the vehicle. Both the long range and short range lidars may be co-located in a single housing 408a or 408b as shown, or may be disposed separately on the vehicle. In addition, left and right side sensor units 416a and 416b may be located along the rear of the vehicle, such as the trailer. Here, these sensor units have corresponding FOVs 418a and 418b, for instance as part of the close-in sensing system to detect objects immediately adjacent to the rear portion (e.g., trailer) of the vehicle. Spacing is shown between different fields of view for clarity in the drawing; however, in actuality there may be no break in the coverage. The specific placements of the sensor assemblies and fields of view is merely exemplary, and may be different depending on, e.g., the type of vehicle, the size of the vehicle, FOV requirements, etc.

Figure 4B:
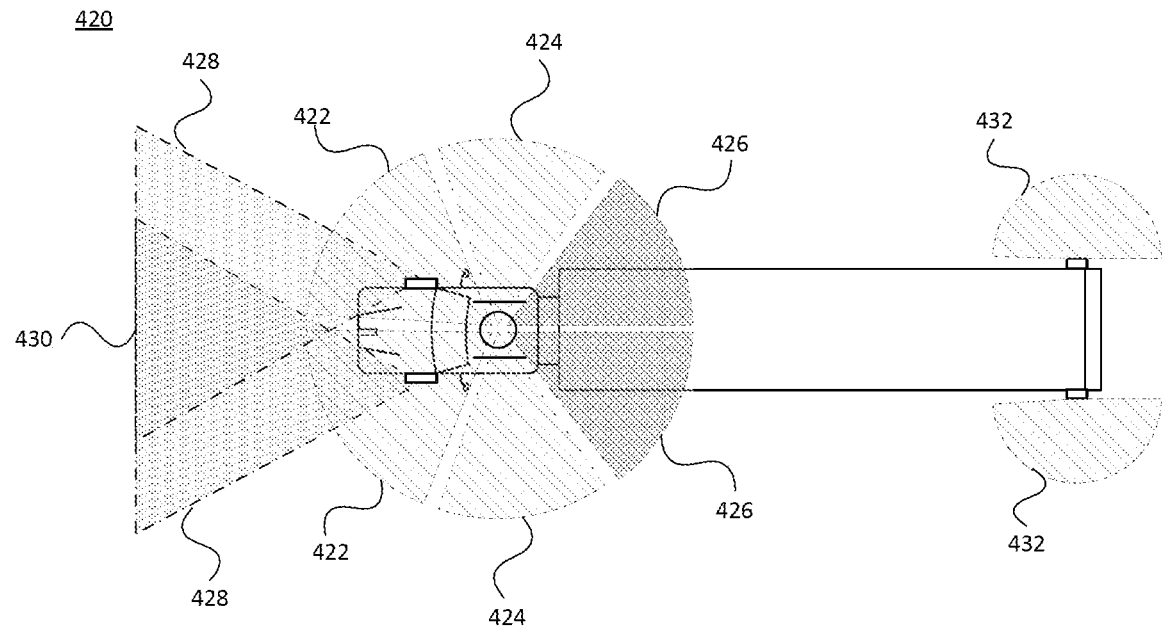

FIG. 4B illustrates an example configuration 420 for either (or both) of radar and camera sensors in a rooftop housing and on both sides of a tractor-trailer vehicle. Here, there may be multiple radar and/or camera sensors in each of the sensor housings 402, 408 and/or 416. As shown, there may be sensors in the rooftop housing with front fields of view 422, side fields of view 424 and rear fields of view 426. As with region 406, the trailer may impact the ability of the sensors with FOVs 426 to detect objects behind the vehicle, e.g., due to self-reflection of certain signals. Sensors in the side sensor assemblies 408 may have forward facing fields of view 428 (and side and/or rear fields of view as well). And sensors in the rear perimeter assemblies 416 may have side and rearward facing FOVs 432. As with the lidars discussed above with respect to FIG. 4A, the sensors of FIG. 4B may be arranged so that the adjoining fields of view overlap, such as shown by overlapping region 430. The overlap regions here similarly can provide redundancy and enhanced resolution, and have the same benefits should one sensor suffer degradation in performance.

These sensors are employed to gather information about the external environment around the vehicle, including other objects, road conditions, weather conditions, etc. Sensor information can also be used to obtain pose and other information about the vehicle itself, such as an accurate trailer position relative to the tractor. The on-board control system may be able to use the received sensor information and a kinematic model of the vehicle in conjunction with geographic data (e.g., maps) to plan routes or select trajectories that are optimized for vehicle maneuvering.

These and other sensors can detect not only the location of objects in the environment, but also their height and other information as well. This may be done by making multiple scans of the environment by one or more sensors. By way of example, illustration 440 of FIG. 4C shows a vehicle using a sensor assembly to scan for objects in the environment. The sensor assembly may be, e.g., rooftop sensor assembly, a front, side or rear perimeter sensor assembly, etc. The sensor assembly may include one or more lidar, radar, camera or other sensors therein. In the scenario of FIG. 4C, solid and dashed lines 442 emanating from the housing indicate examples of individual scans of the environment. For instance, 10 (or more or less) individual scans may be made by a given sensor per scan period. This may include adjusting the sensor's FOV up or down, left or right, e.g., with a motor, servo or other actuator. The individual scans may be selected to cover particular portions of the sensor's FOV or selected regions around the vehicle. Illustration 460 of FIG. 4D shows that some of the scans (e.g., via the dotted line 476 and dash-dot line 478) may generate one or more return signals from objects in the vehicle's environment.

Raw return signals from lidar scans form a point cloud of information about the external environment. Based on this information, the on-board control system (e.g., computing devices 202 or 302) may detect objects of different size, shape and height, such as passenger vehicles, bicycles, streetlights and street signs, foliage, curbs, etc. However, the presence of precipitation or fouling along a surface of a window that is being "looked-through" by another sensor can adversely affect emitted and returned signals, which can provide a false representation about the external environment.

For instance, as shown in example 460 of FIG. 4D, a window or other cover element 462 is disposed between a sensor area 464 and the external environment 466. In this example, a sensor 468, such as a lidar sensor, is disposed in the sensor area 464. The sensor 468 is configured to emit laser light at one or more selected frequencies. The sensor 468 may be stationary or able to rotate, either relative to the cover element 462 or in conjunction with rotation of the cover element 462. The cover element 462 is transparent to the frequencies emitted and/or received by the sensor 468.

As shown, one or more objects may be on the outer surface 470 of the cover element 462, e.g., precipitation such as a water droplet 472 and/or fouling 474, e.g., dust, dirt, mud, etc. Such objects may alter or block emitted or received signals. By way of example, as seen by the dashed lines 476, emitted beams from the sensor may pass through the cover element 462 unimpeded (e.g., 476a), may be refracted by water droplet 472 or another liquid or solid (e.g., 476b), or may be partially or fully blocked (or reflected) by fouling 474 (e.g., 476c). Similarly, as seen by the dash-dot lines 478, received beams may pass through the cover element 462 unimpeded to the sensor (e.g., 478a), may be refracted by water droplet 472 or another liquid or solid (e.g., 478b), or may be partially or fully blocked (or reflected) by fouling 474 (e.g., 478c).

In order to identify the presence of precipitation and/or fouling on the outer surface of the cover element, as noted above a waveguide layer is used in conjunction with a laser emitter and receiver module. The waveguide layer is arranged along the cover element. By way of example, the waveguide layer may be deposited as a thin, uniform layer of a high index material over the glass of the cover element, etched (e.g., lithographically) into, adhered or otherwise applied on the external facing surface of the cover element. The material's index of refraction should be greater than the glass's index of refraction. The higher the delta (difference) between the glass index and the waveguide index would result in a more effective waveguide. For instance, for glass having an index of about 1.5, the waveguide may have an index on the order of 1.8 or more, or at least 10-20% higher. The waveguide layer can act as a single mode waveguide.

Figure 5A:
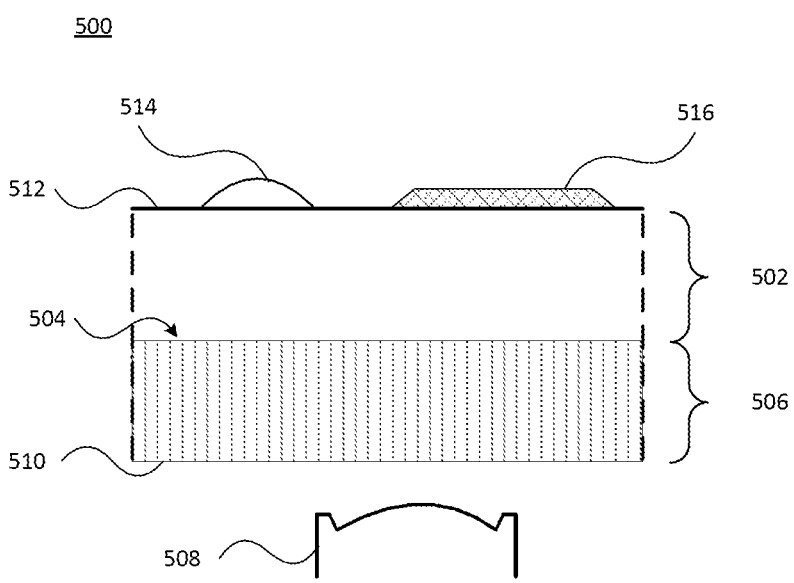

FIG. 5A illustrates one example 500, in which waveguide layer 502 is arranged on surface 504 of glass 506 of the cover element. Sensor 508 is disposed beneath the cover element facing surface 510 of the glass 506, and is configured to emit and/or receive signals at one or more selected wavelengths (e.g., optical, near infrared, etc.) through the glass 506 (or other base layer) and waveguide layer 502. As shown in this example, objects may be on outer surface 512 of the waveguide layer 502, e.g., precipitation such as a water droplet 514 and/or fouling 516, e.g., dust, dirt, mud, etc.

Figure 5B:
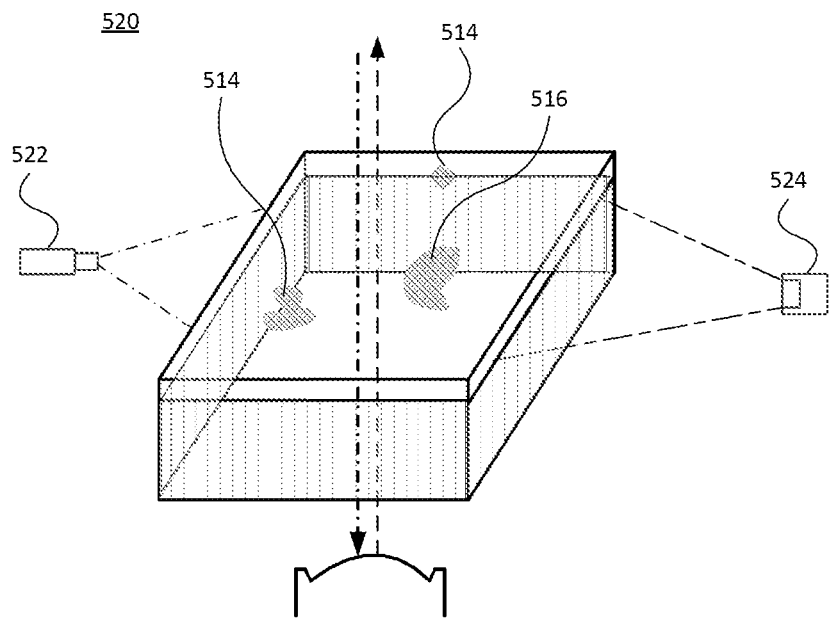
Figure 5C:
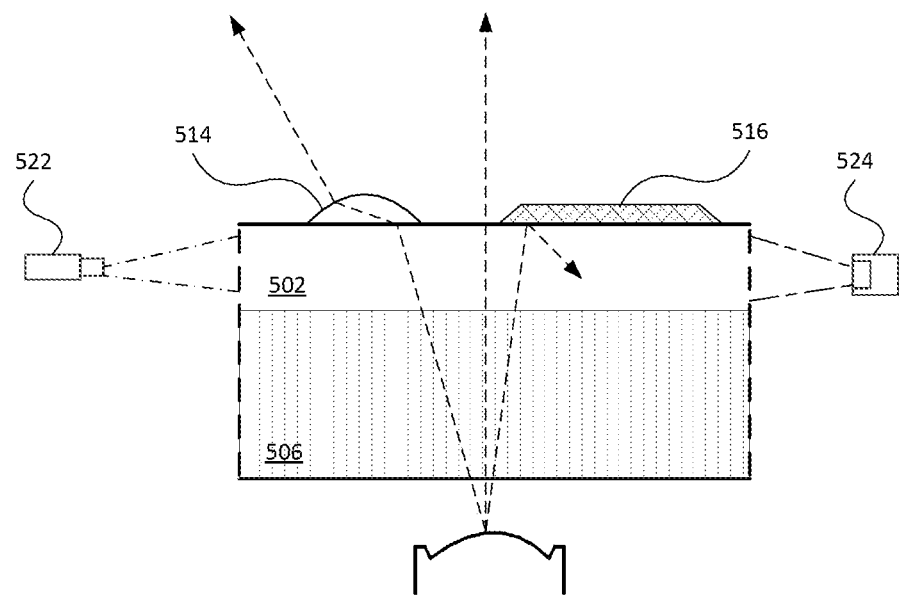

As shown in the perspective view 520 of FIG. 5B and the side view 540 of FIG. 5C, laser 522 is operationally coupled to one side of the waveguide layer 502, and detector 524 is operationally coupled to an opposing side of the waveguide layer 502. The laser 522 is configured to emit light at one or more selected wavelengths along one side of the waveguide layer 502. The laser light propagating along the waveguide inherently interacts with material on either side of it—the glass window itself on one side, and the air (or water/fouling) on the other side. In particular, the light is affected (distorted) by precipitation and/or fouling on the surface of the waveguide layer. Detector 524 receives the resultant light that has been affected, and the system is able to determine whether water and/or fouling is present, an amount of such material, and how to address its presence.

FIG. 5D illustrates an exemplary view 560, showing how the propagating waveform is affected. In particular, an initial waveform 562a has a first shape or pattern as the light is emitted by laser 522. In this example, a water droplet 564 is disposed on surface 512 facing the external environment.

The laser light propagating along the waveguide inherently interacts with material on either side of it—the glass window 506 itself on one side, and the air (or water/fouling 564) on the other side, resulting in a modified waveform 562b. Accordingly, as shown in this exemplary view, there is an initial evanescent tail 566a of the initial waveform 562a within the glass 506, as well as an evanescent tail 566b of the modified waveform 562b. There is an initial evanescent tail 568a in the air adjacent to the outer surface 512, as well as a modified evanescent tail 568b in the fouling (water droplet 564 in this example) and air. In addition, the peak of the waveform is shown as being shifted from an initial peak 569a to a modified peak 569b due to interaction with the fouling (water droplet 564). Here, in this scenario it can be seen that the peak 569b has shifted towards the surface 512 of the waveguide layer.

In general, any light, even light that is operative for the sensor 508, passing through the waveguide layer will interact with it (not illustrated in FIGS. 5B-5C), which is also true for the light's interaction with, e.g., an anti-reflective or hydrophobic/hydrophilic coating. The waveguide layer can be designed in such a way that the interaction with the light transmitted and/or received by the sensor 508 is trivial (e.g., any impact on the light is de minimis so as to not affect the signal) and/or well-characterized by the system so as to be made trivial in processing the sensor signals, so that any discrepancy is automatically accounted for during signal processing.

The wavelength of light used by the laser/detector pair along the waveguide may be chosen so that it does not cause interference with operation of the sensor (e.g., lidar or camera). For instance, the wavelength may depend on the application. Thus, for an optical camera that sees in the visible wavelength range, an infrared wavelength (e.g., on the order of 800 nm) may be chosen. For a 905 nm lidar sensor module, an infrared wavelength on the order of 1355 nm may be selected. Alternatively, a time domain multiplexing (TDM) arrangement could be used to avoid interference with operation of the sensor.

One particularly beneficial aspect of the waveguide layer is that it can be employed on planar or nonplanar (e.g., curved or arcuate) surfaces. Coatings, such as hydrophobic coatings and/or neutral density layers could also be applied to the waveguide layer (e.g., in a cladding stack). Such coatings/layers should not prevent the water/fouling from contacting the waveguide layer. The coating/layer should have an index and thickness that still allows for the guided light of the waveguide layer to interact with the fouling/water on top of it, based on the propagating waveform formed by the waveguide plus cladding stack.

Figure 5E:
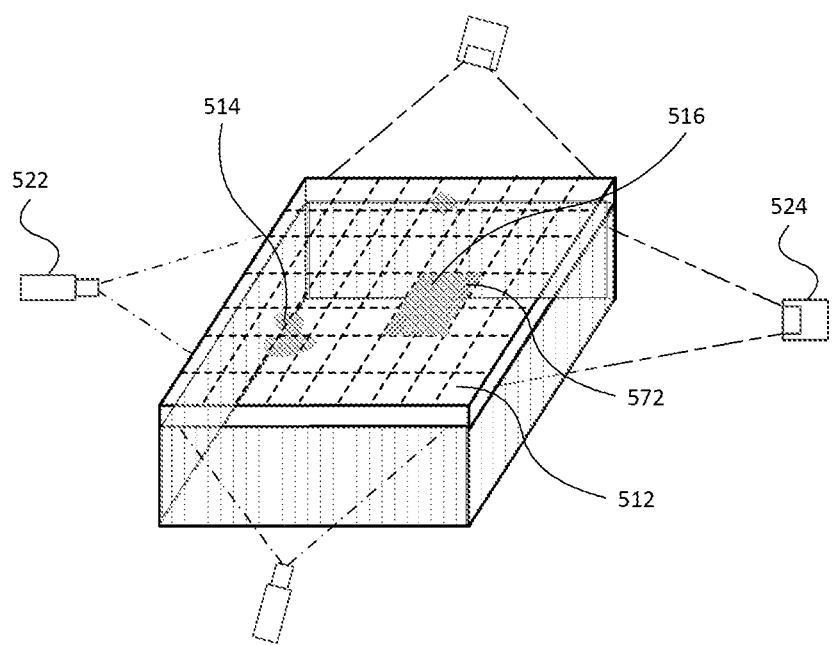

Also, while shown in FIGS. 5B-D as a linear, one-dimensional arrangement of a laser and a detector, the system could have a two-dimensional array of different laser/detector pairs. An example of this is illustrated in view 570 of FIG. 5E. By way of example, lithography could be used to etch the waveguide layer for each individual line in the array (indicated by dashed grid lines). Each pair can have a different wavelength to avoid interference. In one scenario, information from the pairs may be used to identify a particular region(s) along the surface 512 where precipitation and/or fouling is present. For instance, as shown in FIG. 5E a region 572 (bounded by the exemplary dashed lines) identifies the x-y location of fouling 516 along the window surface.

Figure 5F:
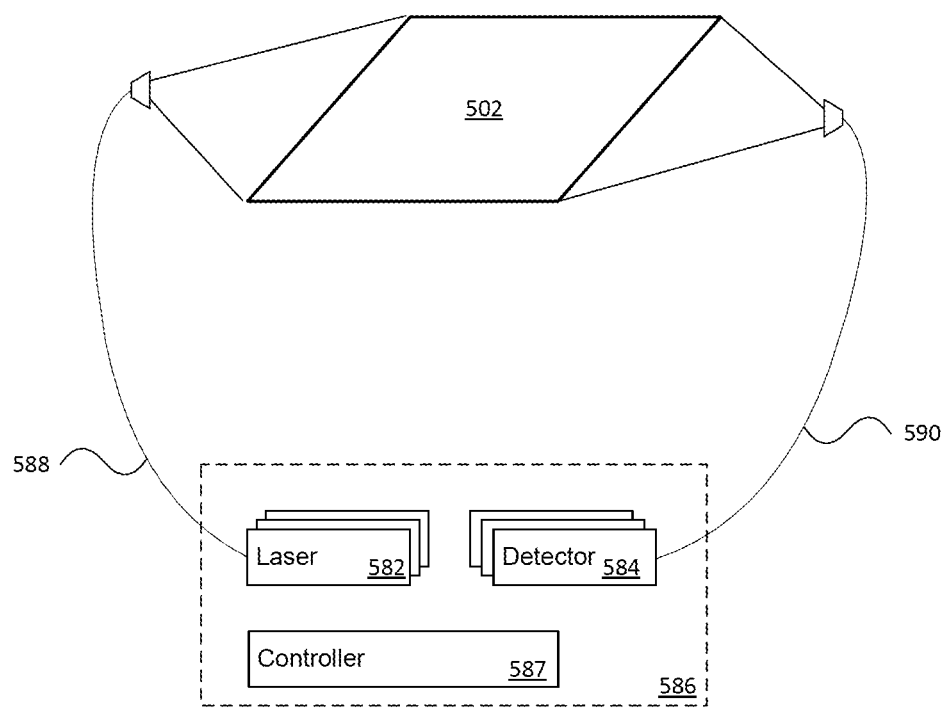

In one scenario, the laser and detector components may be disposed adjacent to the sides of the waveguide. However, in an alternative scenario, the laser and detector components can be remote from the sensor module. For example, as seen in view 580 of FIG. 5F, laser 582 and detector 584 may be part of a module 586 that is physically remote from the waveguide layer 502. In particular, the module 586 could be located in another part of the vehicle separate from the sensor assembly. Here, the module 586 may include a controller 587 that is configured to manage operation of the laser 582 and/or detector 584, as well as any pre or post-processing of the emitted and received waveforms. As shown, the laser 582 is coupled to a first side of the waveguide layer 502 via an optical fiber, light pipe or other optical coupling member 588 that is configured to pass light with the original waveform to the waveguide. Similarly, the detector 584 is coupled to a second side of the waveguide layer via an optical fiber, light pipe or other optical coupling member 590 that is configured to pass light that may have a modified waveform to the detector.

One advantage to this arrangement, which could be significantly beneficial to non-custom, commercial implementations such as for a fleet of self-driving vehicles, is to avoid making the sensor housing too big or otherwise adding complexity to the sensor module. Another advantage is that this arrangement can be employed for different sensor assemblies disposed along different parts of the vehicle, managed by a single controller 587 (or other processing device, such as computing device 202 or 302, or ECU 342). In this case, different laser/detector pairs may each be associated with a respective waveguide layer 502. The controller 587 (or other processing device), could manage operation of each pair as well as any waveform processing.

The waveform information received by the detector(s) from the waveguide layer(s) of one or more sensor covers can be employed to make decisions about cleaning the sensor covers using corresponding cleaning modules associated with the respective covers. Thus, upon detection of precipitation or fouling, the cleaning module can be actuated as needed to clean the sensor cover. In one scenario, there may be an inference regarding the amount of water or fouling that exists from the information gathered, in which a decision about how to clean is made based on that inference. In addition or alternatively, the system may detect whether the cleaning was effective, possibly triggering more cleaning, based on the fouling detection described herein. Furthermore, it may also be helpful to be able to adjust the temperature of a cleaning fluid or the intensity of a blast of air (e.g., from an air blade or puffer cleaner), for instance based on a detection or inference of how much fouling there is.

Figure 5G:
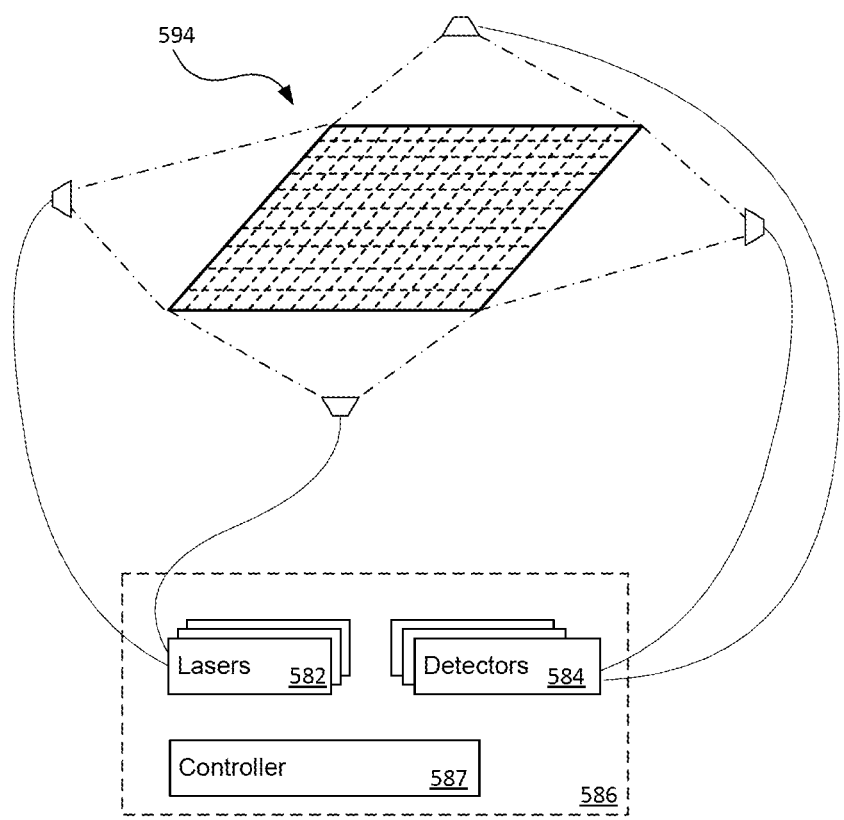

The waveform information could also be employed by the system to account for surface fouling, e.g., by weighting or discounting certain sensor information. By way of example, for certain sensors, part of the field of view directly correlates to part of the aperture. Consider a camera, or a scanning lidar where the operative beam is much smaller than the aperture and scans across the aperture as it changes angle. In these cases, in conjunction with the x/y or "grid" configuration 594 illustrated in view 592 of FIG. 5G, the information obtained about the location of the fouling along the surface could allow the system to directly know what part of the sensor information (e.g., section of camera image, certain pitches of lidar returns) are known to be obstructed by fouling. This information may be very valuable when processing the images or points, since the system then knows about and/or can throw away false-positive object detection/classification data. For other sensors, knowing the percentage of the aperture that's fouled/obstructed enables the system to understand possible range degradations or channel cross-talk expectations. In turn, such information may be used to process the data or make decisions about how the vehicle is able to drive. For example, a turn, lane change or merge may be delayed or not made if the sensor window has more than some threshold obstruction (fouling). Or information from one or more other sensors may be weighted more heavily than the occluded sensor. And in a further configuration, if it is determined that the fouling affects certain wavelengths more than other wavelengths, then the sensor behind the aperture may be able to change its operative wavelength materially enough to minimize the impact of a certain obstructing fouling. In this case, an array of different-wavelength emitters and detectors may be employed.

In addition, the system could "pre-characterize" a sensor cover to identify whether the exterior surface is dry, wet, dirty, etc. For instance, baseline information about the sensor cover may be obtained at the time a vehicle departs for a trip, e.g., leaving a parking area to pick up a passenger or a depot to deliver cargo. Each sensor cover could be checked periodically or according to some schedule.

By way of example, the system may obtain baseline measurements when the covers/apertures are known to be clear of water or fouling. The system could process the signals obtained by the detector to identify deltas (differences) from the baseline, which may indicate the presence of water or debris/fouling. This may act as a "continuous recalibration", or a "relative signals" approach, where relative changes in the received signal may trigger a cleaning process. For instance, a change in the received signal above some threshold, e.g., a 10% change in the signal, may indicate that water or fouling is now covering the sensor cover.

An alternative is to pre-characterize (calibrate) what signals are created by known types of fouling and/or by certain water or other precipitation levels for a given aperture. This information can be stored (e.g., in memory 206 or 306) to be used during real-time autonomous driving to compare signals to and determine which fouling/water condition is closest to what is currently being seen from the emitter/detector system. Still another approach involves collecting and labeling data in all states of clean/fouled/wet, and training a machine learning model to detect these states based on the signals coming from the emitter/detector system. Here, for instance, different types of precipitation and fouling (e.g., mud, dust, oil) may be indexed in a lookup table or other database in relation to sensor type (e.g., optical camera, lidar, etc.), sensor window configuration (e.g., flat or curved) and/or other factors. Thus, in one scenario, the data from this fouling detection system may be incorporated directly into the machine learning models that classify images (e.g., from optical cameras) and point clouds (e.g., from lidar sensors). Here, a machine learning model could be trained on and then use combined camera image plus fouling information in order to classify objects directly.

And in yet another scenario, the system could employ pulse encoding in which the emitter is pulsed in a specific pattern in order to allow filtering of background noise. This may be helpful if the system is operating in a wavelength for which there's lots of background noise, such as near-infrared during the daytime, when there may be a lot of sunlight that can impact the signals. These approaches are not mutually exclusive, and could be used together to process the information from the emitter/detector system and determine the level of fouling/wetness.

Furthermore, the system could use other information, such as the ambient temperature, real-time weather data, map data, etc., to discern why types of objects have accrued (or are likely to accrue) on the sensor cover. For instance, depending on the temperature, humidity and/or elevation, the system may determine whether precipitation is water droplets, ice, sleet or snow on the sensor cover, and use this information to select a cleaning profile accordingly. The system could also use the waveform information to confirm whether a cleaning fluid or air sprayer is working, has a fault (e.g., is only cleaning a portion of the sensor cover) or is out of fluid. Thus, if a splash of mud gets on the aperture/window, is detected, and the cleaning system is activated but received data indicates that nothing has changed in the received signal, then that is a good indicator that the cleaning system did not actually clean the aperture.

As noted above, the technology is applicable for various types of vehicles, including passenger cars, buses, motorcycles, emergency vehicles, RVs, construction vehicles, and large trucks or other cargo carrying vehicles. In addition to using the sensor cover waveform information for operation of an individual self-driving vehicle, this information may also be shared with other self-driving vehicles, such as vehicles that are part of a fleet, as well as with a back-end system for further evaluation. For instance, if different sensors of one vehicle are being affected due to sleet or snow, other vehicles in that area may be notified so that they can use the information to check cleaning fluid levels or otherwise ensure their sensor systems are operating effectively. Also, data obtained about precipitation or fouling from one vehicle may be sent to a back end processing system, for example to identify what specifically is causing the fouling or the type(s) of items that are accruing on the sensor covers, so that effective cleaning approaches may be determined. In turn, this information may be shared with that particular vehicle or disseminated to the entire fleet.

Figure 6A:
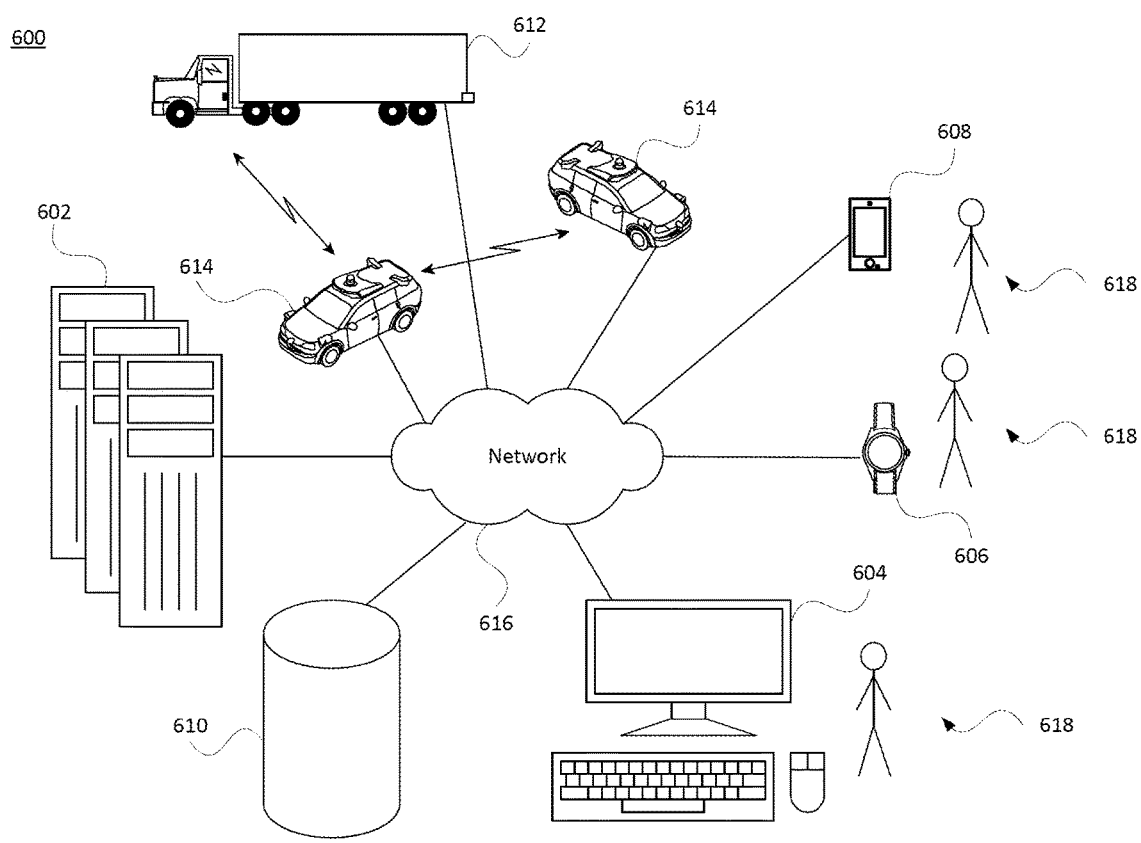
FIGS. 6A-B illustrate an example system in accordance with aspects of the technology.
Figure 6B:
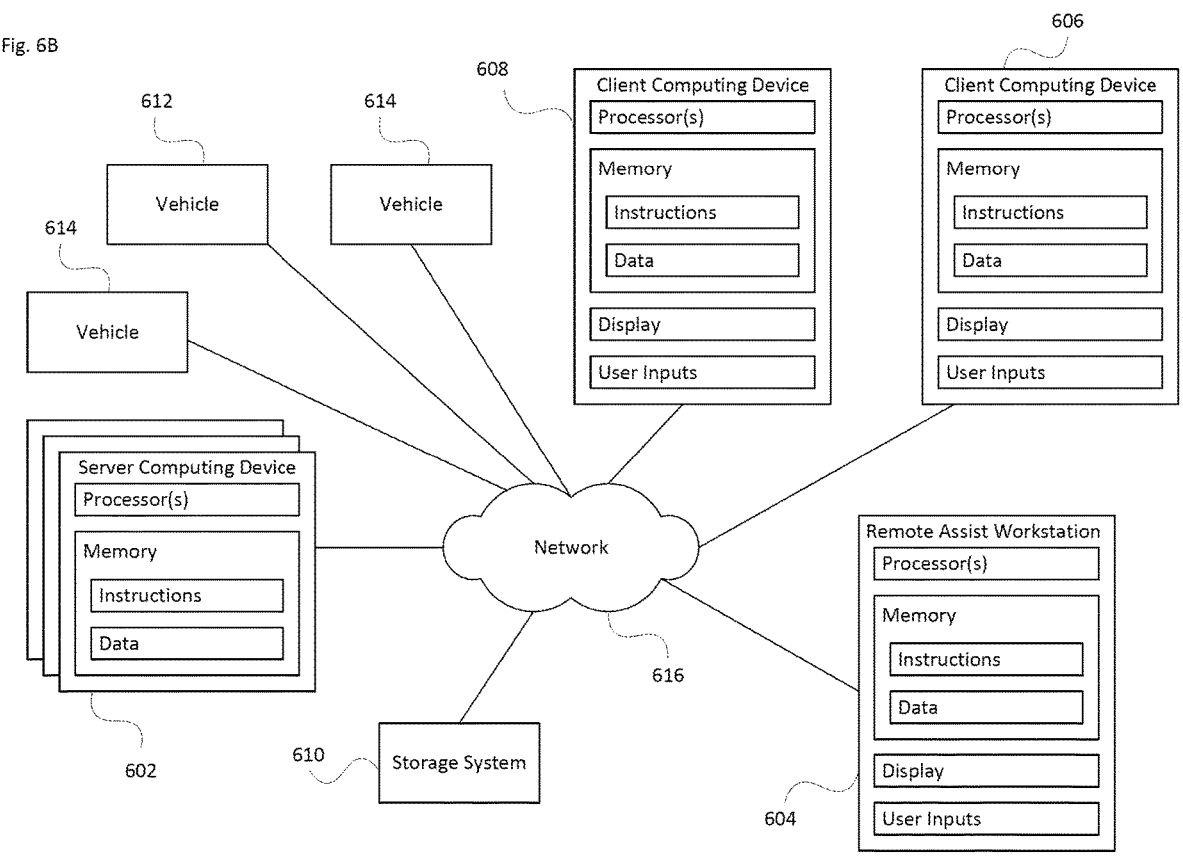

One example of such an arrangement is shown in FIGS. 6A and 6B. In particular, FIGS. 6A and 6B are pictorial and functional diagrams, respectively, of an example system 600 that includes a plurality of computing devices 602, 604, 606, 608 and a storage system 610 connected via a network 616. System 600 may also include vehicles 612 and/or 614 configured to operate in an autonomous driving mode, which may be configured the same as or similarly to the vehicles of FIGS. 1A-E. Vehicles 612 and/or vehicles 614 may be part of a fleet of vehicles. Although only a few vehicles and computing devices are depicted for simplicity, a typical system may include significantly more.

As shown in FIG. 6B, each of computing devices 602, 604, 606 and 608 may include one or more processors, memory, data and instructions. Such processors, memories, data and instructions may be configured similarly to the ones described above with regard to FIG. 2 or 3A.

The various computing devices and vehicles may communicate directly or indirectly via one or more networks, such as network 616. The network 616, and intervening nodes, may include various configurations and protocols including short range communication protocols such as Bluetooth™, Bluetooth LE™, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, computing device 602 may include one or more server computing devices having a plurality of computing devices, e.g., a load balanced server farm, that exchange information with different nodes of a network for the purpose of receiving, processing and transmitting the data to and from other computing devices. For instance, computing device 602 may include one or more server computing devices that are capable of communicating with the computing devices of vehicles 612 and/or 614, as well as computing devices 604, 606 and 608 via the network 616. For example, vehicles 612 and/or 614 may be a part of a fleet of self-driving vehicles that can be dispatched by a server computing device to various locations. In this regard, the computing device 602 may function as a dispatching server computing system which can be used to dispatch vehicles to different locations in order to pick up and drop off passengers or to pick up and deliver cargo. In addition, server computing device 602 may use network 616 to transmit and present information to a user of one of the other computing devices or a passenger of a vehicle. In this regard, computing devices 604, 606 and 608 may be considered client computing devices.

As shown in FIG. 6A each client computing device 604, 606 and 608 may be a personal computing device intended for use by a respective user 618, and have all of the components normally used in connection with a personal computing device including a one or more processors (e.g., a central processing unit (CPU)), memory (e.g., RAM and internal hard drives) storing data and instructions, a display (e.g., a monitor having a screen, a touch-screen, a projector, a television, or other device such as a smart watch display that is operable to display information), and user input devices (e.g., a mouse, keyboard, touchscreen or microphone). The client computing devices may also include a camera for recording video streams, speakers, a network interface device, and all of the components used for connecting these elements to one another.

Although the client computing devices may each comprise a full-sized personal computing device, they may alternatively comprise mobile computing devices capable of wirelessly exchanging data with a server over a network such as the Internet. By way of example only, client computing devices 606 and 608 may be mobile phones or devices such as a wireless-enabled PDA, a tablet PC, a wearable computing device (e.g., a smartwatch), or a netbook that is capable of obtaining information via the Internet or other networks.

In some examples, client computing device 604 may be a remote assistance workstation used by an administrator or operator to communicate with drivers of dispatched vehicles. Although only a single remote assistance workstation 604 is shown in FIGS. 6A-B, any number of such workstations may be included in a given system. Moreover, although operations workstation is depicted as a desktop-type computer, operations workstations may include various types of personal computing devices such as laptops, netbooks, tablet computers, etc. By way of example, the remote assistance workstation may be used by a technician or other user to perform a post-processing analysis of the waveform data from the sensor cover waveguide layers. The post-processing analysis may be used in different ways. For instance, the data from the sensor(s), coupled with environmental data, may be used to identify a particular type of fouling. It may also be used to determine an effective cleaning approach to remove that type of fouling during future driving situations.

Storage system 610 can be of any type of computerized storage capable of storing information accessible by the server computing devices 602, such as a hard-drive, memory card, ROM, RAM, DVD, CD-ROM, flash drive and/or tape drive. In addition, storage system 610 may include a distributed storage system where data is stored on a plurality of different storage devices which may be physically located at the same or different geographic locations. Storage system 610 may be connected to the computing devices via the network 616 as shown in FIGS. 6A-B, and/or may be directly connected to or incorporated into any of the computing devices.

Storage system 610 may store various types of information. For instance, the storage system 610 may also store autonomous vehicle control software which is to be used by vehicles, such as vehicles 612 or 614, to operate such vehicles in an autonomous driving mode. Storage system 610 may also store vehicle models and/or information about the sensor assemblies, cleaning modules, etc. Such information may be updated and shared with specific vehicles or the entire fleet as needed. It may be updated in real time, periodically, or off-line as additional self-reflection information or other data is obtained. The storage system 610 can also include map information, route information, weather information, etc. This information may be shared with the vehicles 612 and 614, for instance to help with sensor cover/waveform analysis by the on-board computer system (s), such as during real-time driving by a particular vehicle when precipitation and/or fouling is detected at a given sensor.

Figure 7:
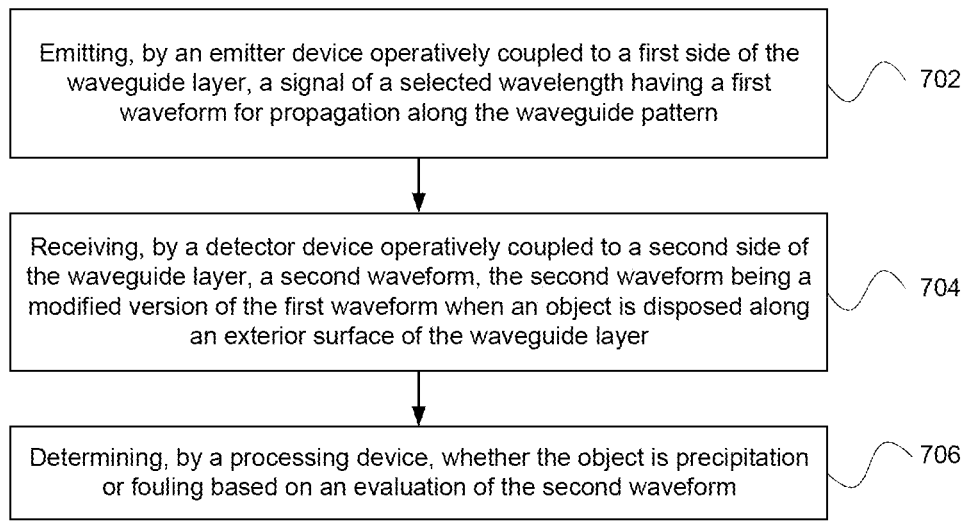
FIG. 7 illustrates a method in accordance with aspects of the technology.

FIG. 7 illustrates an example method of operation 700 in accordance with the above discussions. In particular, the method is for detecting the presence of precipitation or fouling on a sensor assembly, in which the sensor assembly has a base layer that is configured to pass signals of one or more wavelengths therethrough, a sensor device is arranged adjacent to a first surface of the base layer and is configured to perform at least one of emit or receive signals of the one or more wavelengths through the base layer, and a waveguide layer having a waveguide pattern is disposed along a second surface of the base layer opposite the first surface. At block 702, the method includes emitting, by an emitter device operatively coupled to a first side of the waveguide layer, a signal of a selected wavelength having a first waveform for propagation along the waveguide pattern. At block 704, the method includes receiving, by a detector device operatively coupled to a second side of the waveguide layer, a second waveform, the second waveform being a modified version of the first waveform when an object is disposed along an exterior surface of the waveguide layer. And at block 706, the method includes determining, by a processing device, whether the object is precipitation or fouling based on an evaluation of the second waveform.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A sensor assembly, comprising:
    a base layer that is configured to pass sensor signals corresponding to a sensor device therethrough, the sensor signals having one or more wavelengths, the base layer having a first surface and a second surface opposite the first surface, the base layer being configured for arrangement with the first surface disposed adjacent to the sensor device; and a waveguide layer having a first surface and a second surface opposite the first surface, the first surface of the waveguide layer being adjacent to the second surface of the base layer, the waveguide layer having a waveguide pattern extending between a first side and a second side of the waveguide layer;

wherein the waveguide layer is configured to propagate a first signal from the first side of the waveguide layer to the second side of the waveguide layer, in which propagation of the first signal is used by the sensor assembly to detect when an object is disposed along the second surface of the waveguide layer.

2. The sensor assembly of claim 1, wherein the first signal has a wavelength that does not interfere with the one or more wavelengths of the sensor signals.

3. The sensor assembly of claim 1, wherein the first signal has a different wavelength than the one or more wavelengths of the sensor signals.

4. The sensor assembly of claim 1, further comprising a controller configured to detect whether the object is disposed along the second surface of the waveguide layer based on an evaluation of the first signal.

5. The sensor assembly of claim 4, wherein:
the controller is further configured to detect a location of the object along the second surface of the waveguide layer based on the evaluation of the first signal; and
the controller is further configured to determine whether the object is precipitation or fouling based on the evaluation of the first signal.

6. The sensor assembly of claim 1, wherein the sensor signals are optical or infrared signals.

7. The sensor assembly of claim 1, wherein the base layer comprises a glass material.

8. The sensor assembly of claim 1, wherein the waveguide layer is either etched into or deposited onto the second surface of the base layer.

9. The sensor assembly of claim 1, wherein the waveguide layer comprises a uniform layer of a high index material having a higher index than the base layer.

10. The sensor assembly of claim 9, wherein the waveguide layer is configured to function as a single mode waveguide.

11. The sensor assembly of claim 1, further comprising a cleaning module operatively arranged with the second surface of the waveguide layer, wherein the cleaning module is configured to perform a cleaning operation upon detection of the object being disposed along the second surface of the waveguide layer.

12. A sensor assembly, comprising:
a base layer that is configured to pass signals of one or more wavelengths therethrough, the base layer having a first surface and a second surface opposite the first surface;
a waveguide layer having a first surface and a second surface opposite the first surface, the first surface of the waveguide layer being adjacent to the second surface of the base layer, the waveguide layer having a waveguide pattern extending between a first side and a second side of the waveguide layer;
a first emitter device operatively coupled to the first side of the waveguide layer, the first emitter device being configured to emit a first signal of a first selected wavelength having a first waveform for propagation along the waveguide pattern; and
a first detector device operatively coupled to the second side of the waveguide layer, the first detector device being configured to receive the first signal having a second waveform, the second waveform being a modified version of the first waveform when an object is disposed along the second surface of the waveguide layer.

13. The sensor assembly of claim 12, further comprising a controller operatively coupled to the first emitter device and the first detector device, the controller being configured to detect whether the object is disposed along the second surface of the waveguide layer based on an evaluation of the second waveform.

14. The sensor assembly of claim 13, wherein the controller is configured to determine whether the object is precipitation or fouling based on the evaluation of the second waveform.

15. The sensor assembly of claim 12, wherein the first emitter device is a laser.

16. The sensor assembly of claim 12, wherein:
the first emitter device is disposed adjacent to the first side of the waveguide layer; and
the first detector device is disposed adjacent to the second side of the waveguide layer.

17. The sensor assembly of claim 12, wherein:
the first emitter device is positioned remote from the first side of the waveguide layer and connected to the first side via a first optical coupling member; and
the first detector device is positioned remote from the second side of the waveguide layer and connected to the second side via a second optical coupling member.

18. The sensor assembly of claim 12, further comprising:
a second emitter device operatively coupled to a third side of the waveguide layer, the third side being disposed between the first and the second sides, wherein the second emitter device is configured to emit a second signal of a second selected wavelength having a third waveform for propagation along the waveguide pattern; and
a second detector device operatively coupled to a fourth side of the waveguide layer, the fourth side being opposite the third side, wherein the second detector device is configured to receive the second signal having a fourth waveform, the fourth waveform being a modified version of the second waveform when the object is disposed along the second surface of the waveguide layer.

19. The sensor assembly of claim 18, further comprising a controller operatively coupled to the first and second emitter devices and the first and second detector devices, the controller being configured to detect a location of the object along the second surface of the waveguide layer based on an evaluation of the second and fourth waveforms.

20. The sensor assembly of claim 12, further comprising a cleaning module operatively arranged with the second surface of the waveguide layer, wherein the cleaning module is configured to perform a cleaning operation upon detection of precipitation or fouling along the second surface of the waveguide layer based on the first signal having the second waveform.

* * * * *